United States Patent
Tani et al.

(10) Patent No.: US 8,104,282 B2
(45) Date of Patent: Jan. 31, 2012

(54) POWER GENERATION COMPLEX PLANT AND PLANT CONTROL METHOD

(75) Inventors: Akinori Tani, Kokubunji (JP); Akimasa Nakai, Saitama (JP); Masuo Yamasaki, Tokyo (JP); Kazuo Nogami, Yokohama (JP); Yoji Kubo, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 486 days.

(21) Appl. No.: 12/388,185

(22) Filed: Feb. 18, 2009

(65) Prior Publication Data

US 2009/0211252 A1    Aug. 27, 2009

(30) Foreign Application Priority Data

Feb. 19, 2008  (JP) .................................. 2008-037894

(51) Int. Cl.
*F01K 13/00* (2006.01)
*F01K 3/00* (2006.01)
*F01K 13/02* (2006.01)

(52) U.S. Cl. ............................... 60/652; 60/645; 60/660

(58) Field of Classification Search .................... 60/645, 60/652, 660, 661, 664
See application file for complete search history.

(56) References Cited

U.S. PATENT DOCUMENTS

| | | | |
|---|---|---|---|
| 4,007,595 A | 2/1977 | Braytenbah et al. |
| 4,253,308 A | 3/1981 | Eggenberger et al. |
| 4,329,592 A | 5/1982 | Wagner et al. |
| 4,353,216 A | 10/1982 | Dickenson |
| 4,357,803 A | 11/1982 | Dickenson |
| 6,647,727 B2 | 11/2003 | Klatt et al. |

FOREIGN PATENT DOCUMENTS

| | | |
|---|---|---|
| DE | 30 21 375 A1 | 12/1980 |
| DE | 31 33 504 A1 | 5/1982 |
| DE | 31 37 121 A1 | 5/1982 |
| JP | 07-133703 A | 5/1995 |
| JP | 2006-266258 A | 10/2006 |

*Primary Examiner* — Thomas Denion
*Assistant Examiner* — Christopher Jetton
(74) *Attorney, Agent, or Firm* — Foley & Lardner LLP

(57) ABSTRACT

A power generation complex plant has a control switch, an overall control unit and a steam bypass facility. The overall control unit determines that a desired steam volume has reached a limit value of the volume of steam to be generated by a steam generating facility. A steam bypass facility control unit adds a bias value B1 to a control command value V4 of the steam bypass facility to generate a new control command value V5 when the desired steam volume is determined to have reached the limit value. The steam bypass facility control unit then controls the volume and pressure of steam passing through the steam bypass facility on the basis of the new control command value V5 so that no switch of control may be made in the control switch.

12 Claims, 12 Drawing Sheets

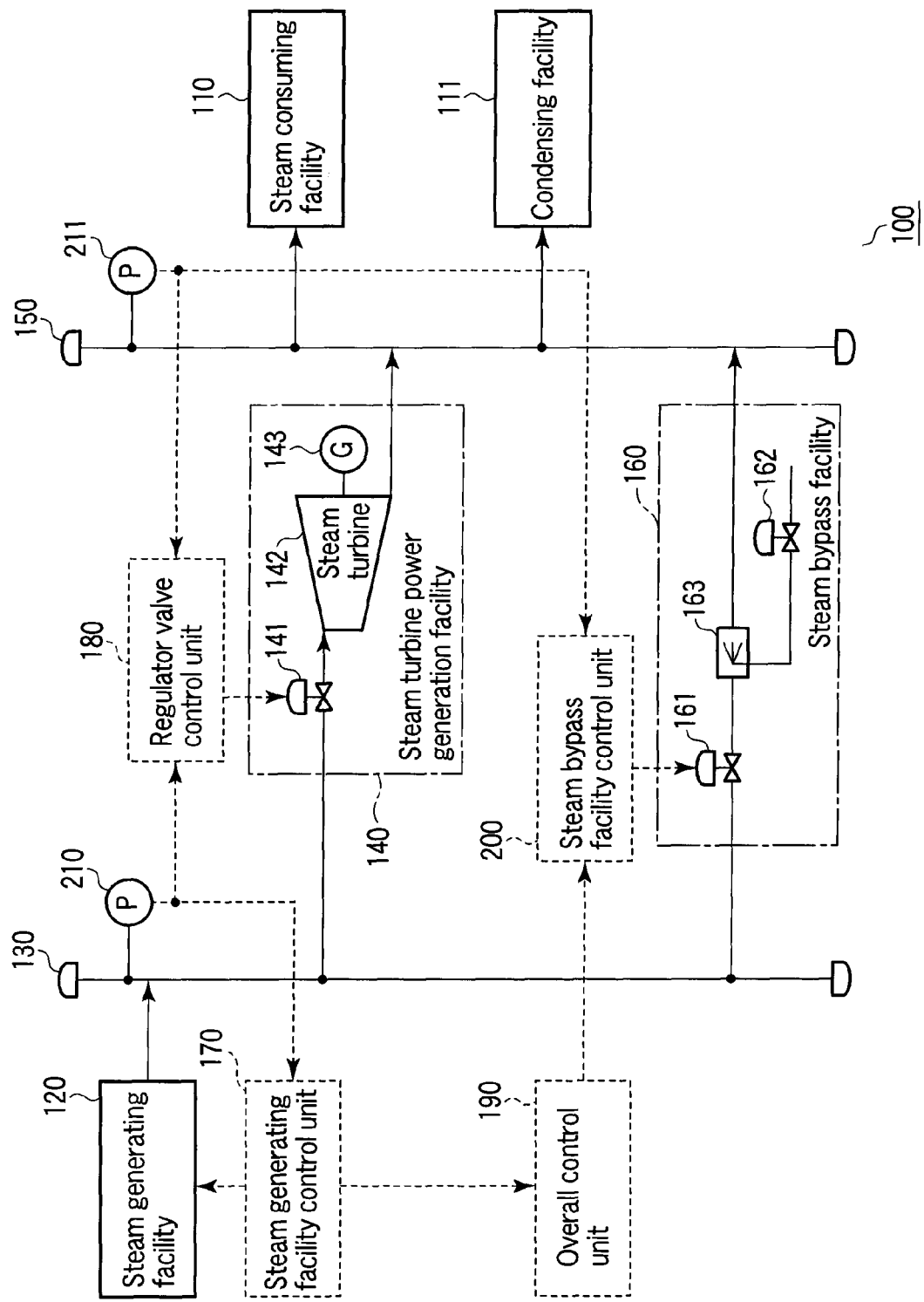
F I G. 1

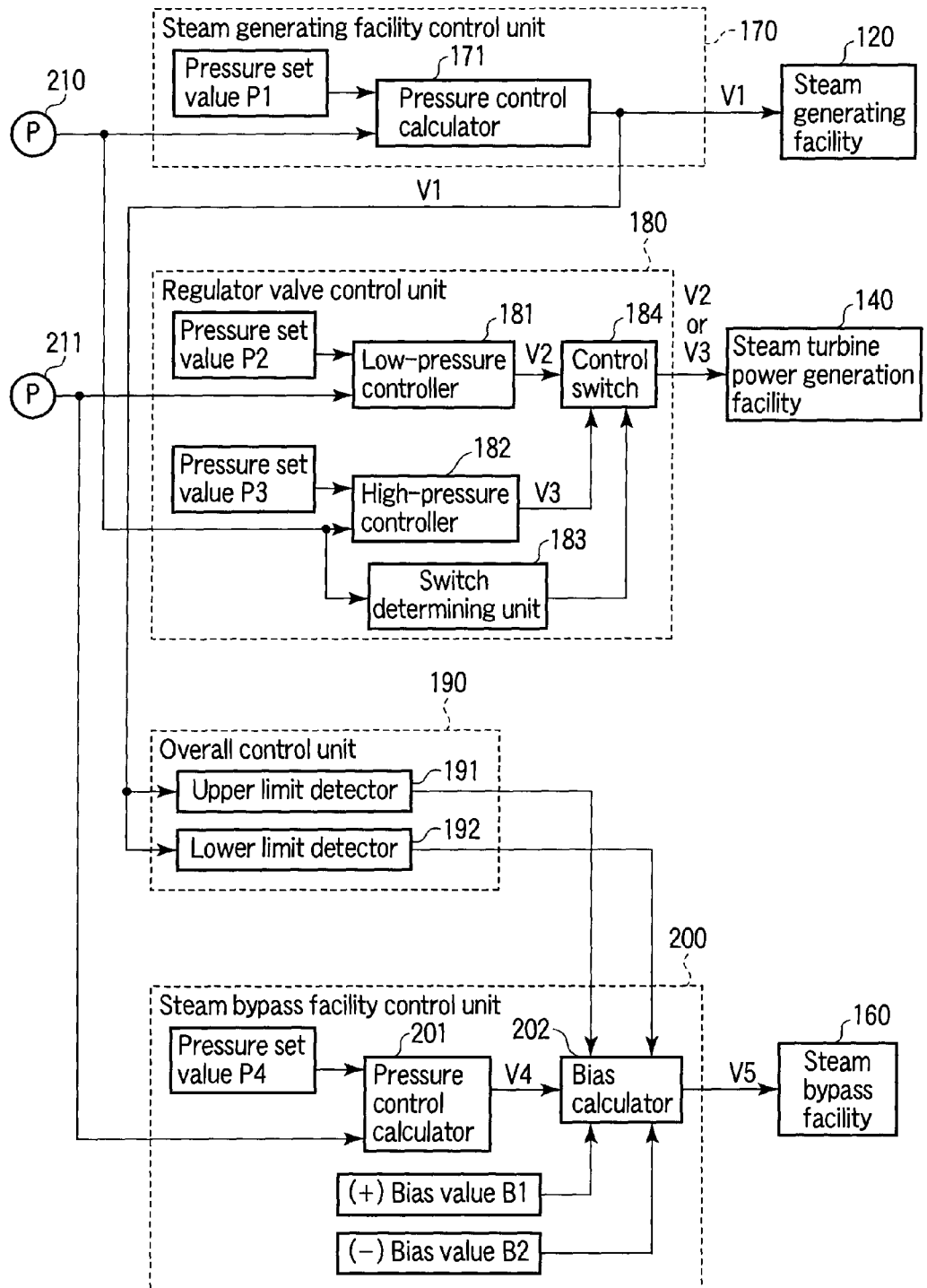
F I G. 2

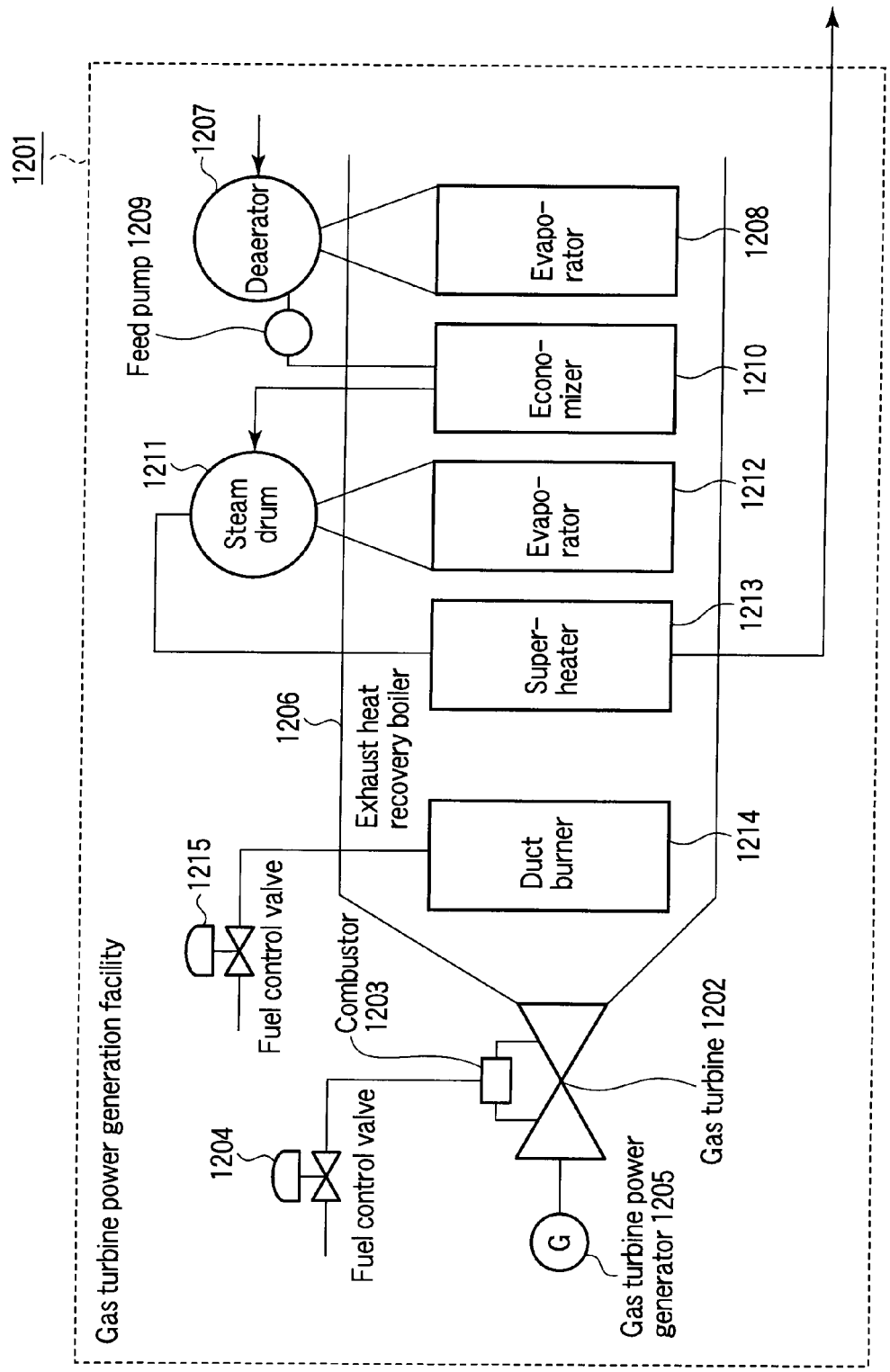
F I G. 3

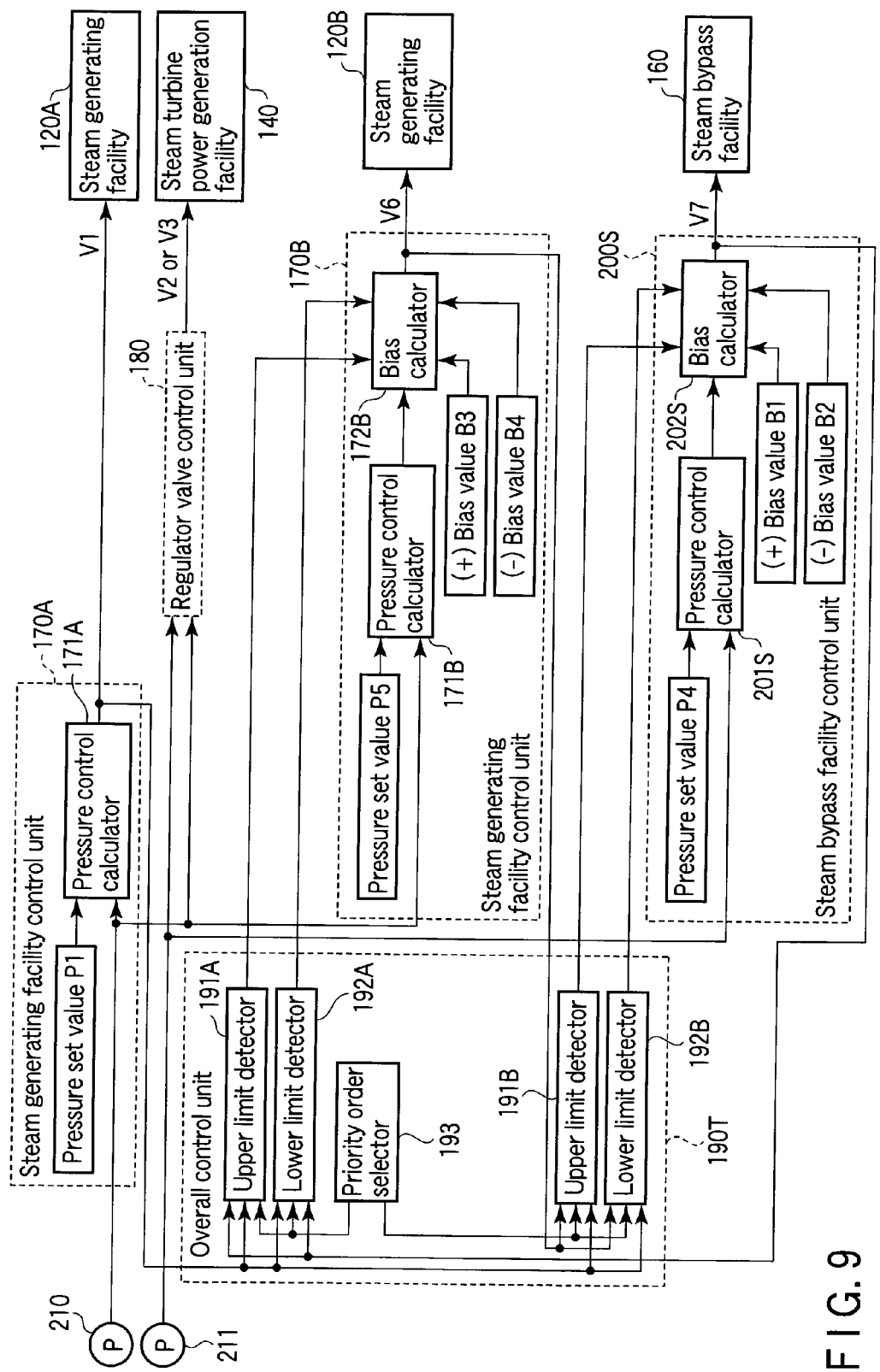
F I G. 9

POWER GENERATION COMPLEX PLANT AND PLANT CONTROL METHOD

CROSS-REFERENCE TO RELATED APPLICATIONS

This application is based upon and claims the benefit of priority from prior Japanese Patent Application No. 2008-037894, filed Feb. 19, 2008, the entire contents of which are incorporated herein by reference.

BACKGROUND OF THE INVENTION

1. Field of the Invention

The present invention relates to a power generation complex plant having a control switch, such as a power generation complex plant equipped with a desalination plant having high stability and control response.

2. Description of the Related Art

Recently, a power generation complex plant equipped with a desalination plant which uses exhaust steam of a power generation facility to generate product water has been utilized in, for example, an area suffering from a water shortage.

Such a power generation complex plant is utilized when at least one of electricity and water is necessary. Specifically, there has been proposed a power generation complex plant capable of improving the power generation efficiency in a part-load operation and reducing the total annual fuel consumption (e.g., refer to Jpn. Pat. Appln. KOKAI Publication No. 2006-266258).

A power generation complex plant generally has a configuration shown in FIG. 12. This power generation complex plant 100P comprises a steam consuming facility 110P, a steam generating facility 120P, a high-pressure steam header 130P, a steam turbine power generation facility 140P, a low-pressure steam header 150P, a steam bypass facility 160P, a steam generating facility control unit 170P, a regulator valve control unit 180P and a steam bypass facility control unit 200P.

The steam consuming facility 110P uses steam such as exhaust steam of the power generation facility. For example, a desalination facility, which uses steam to generate product water, corresponds to the steam consuming facility 110P. Together with the steam consuming facility 110P, a condensing facility 111P for condensing extra steam may be installed.

The steam generating facility 120P generates steam for use in the steam turbine power generation facility 140P and the steam consuming facility 110P. The steam generating facility 120P is, for example, an exhaust heat recovery boiler for using an exhaust gas of a gas turbine as a heat source to generate steam. In particular, an exhaust heat recovery boiler with an auxiliary combustor in which a duct burner is added to an ordinary exhaust heat recovery boiler, for example, corresponds to the steam generating facility 120P.

The steam generated by the steam generating facility 120P is supplied into the high-pressure steam header 130P.

The steam turbine power generation facility 140P generates electricity by use of the steam supplied from the high-pressure steam header 130P. The steam turbine power generation facility 140P has a regulator valve 141P for adjusting the volume of inflow steam.

The steam flowing in from the steam turbine power generation facility 140P is supplied into the low-pressure steam header 150P. The steam consuming facility 110P is configured to use the steam supplied from the low-pressure steam header 150P. In addition, when the volume of steam desired by the steam consuming facility 110P is small, extra steam in the low-pressure steam header 150P is supplied to the condensing facility 111P and cooled down into condensed water.

The steam bypass facility 160P links the high-pressure steam header 130P to the low-pressure steam header 150P in such a manner as to bypass the steam turbine power generation facility 140P. The steam bypass facility 160P adjusts the volume, pressure, and temperature of the steam supplied from the high-pressure steam header 130P and then supplies the steam to the low-pressure steam header 150P. The steam bypass facility 160P has a bypass valve 161P and a bypass spray valve 162P for adjusting the volume of passing steam. In addition, this steam bypass facility 160P is used, for example, in the case where the steam consuming facility 110P is operated without operating the steam turbine power generation facility 140P.

The steam generating facility control unit 170P controls the steam generating facility 120P on the basis of the steam pressure in the high-pressure steam header 130P.

The regulator valve control unit 180P has a low-pressure controller 181P, a high-pressure controller 182P, a switch determining unit 183P and a control switch 184P. The regulator valve control unit 180P opens and closes the regulator valve 141P of the steam turbine power generation facility 140P to control the volume of steam to be supplied to the steam turbine power generation facility 140P.

The low-pressure controller 181P controls the steam supplied from the high-pressure steam header 130P to the steam turbine power generation facility 140P, that is, the position of the regulator valve 141P of the steam turbine power generation facility 140P, on the basis of the steam pressure in the low-pressure steam header 150P. The high-pressure controller 182P controls the steam supplied from the high-pressure steam header 130P to the steam turbine power generation facility 140P on the basis of the steam pressure in the high-pressure steam header 130P. The steam supplied to the steam turbine power generation facility 140P, that is, the position of the regulator valve 141P of the steam turbine power generation facility 140P, is controlled by selecting either the low-pressure controller 181P or the high-pressure controller 182P. However, this is normally controlled by the low-pressure controller 181P.

The switch determining unit 183P determines, from the steam pressure in the high-pressure steam header 130P, that the volume of steam desired by the steam consuming facility 110P is beyond the maximum volume of steam to be generated by the steam generating facility 120P. That is, the switch determining unit 183P determines that the volume of steam desired by the steam consuming facility 110P is beyond the maximum volume of steam to be generated by the steam generating facility 120P when the steam pressure in the high-pressure steam header 130P is lower than a preset threshold value.

The control switch 184P makes a switch from the low-pressure controller 181P to the high-pressure controller 182P to control the position of the regulator valve 141P of the steam turbine power generation facility 140P, when the switch determining unit 183P determines that the steam pressure in the high-pressure steam header 130P is lower than the threshold value.

The steam bypass facility control unit 200P opens and closes the bypass valve 161P and the bypass spray valve 162P to control the volume of steam passing through the steam bypass facility 160P. Here, a temperature decreasing facility 163P is provided for the steam bypass facility control unit 200P. Then, the bypass spray valve 162P opens such that sprayed water is supplied to the temperature decreasing facility 163P. Consequently, the temperature of steam is controlled.

Here, for the power generation complex plant 100P having such a configuration, the low-pressure steam header is generally controlled by the low-pressure controller 181P of the steam turbine. The reason for this is that control by a high-pressure controller 182P leads to a higher volume of steam flowing into the steam turbine power generation facility 140P and the steam bypass facility 160P, and thus to unstable control of the whole power generation complex plant. On the other hand, it is not appropriate to perform control solely by the low-pressure controller 181P without the high-pressure controller 182P. The reason for this is that the steam pressure in the high-pressure steam header 130P may drop faster when the volume of steam desired by the steam consuming facility 110P has increased, which may prevent from maintaining the efficiency of the whole power generation complex plant.

Accordingly, the power generation complex plant 100P comprises the control switch 184P to suitably switch between the control by the low-pressure controller 181P and the control by the high-pressure controller 182P.

However, the steam turbine power generation facility 140P and the steam bypass facility 160P may operate more than necessary due to the switch between the control by the low-pressure controller and the control by the high-pressure controller, resulting in deteriorated stability and control response. The control logic may become more complicated by additional switching control.

BRIEF SUMMARY OF THE INVENTION

According to an aspect of the present invention, there is provided a power generation complex plant comprising: a steam generating facility; a high-pressure steam header into which steam generated in the steam generating facility is supplied; a steam power generating facility which generates electricity by use of the steam supplied from the high-pressure steam header; a low-pressure steam header into which the steam flowing out of the steam power generating facility is supplied; a steam bypass facility which links the high-pressure steam header to the low-pressure steam header in such a manner as to bypass the steam power generating facility and which adjusts the volume, pressure, and temperature of the steam supplied from the high-pressure steam header on the basis of a bypass steam volume control command value and then supplies the steam to the low-pressure steam header; a steam consuming facility which uses the steam supplied from the low-pressure steam header; a low-pressure control unit which controls the volume of steam to be supplied to the steam power generating facility on the basis of the steam pressure in the low-pressure steam header when the steam pressure in the high-pressure steam header is higher than a preset threshold value; a high-pressure control unit which controls the volume of steam to be supplied to the steam power generating facility on the basis of the steam pressure in the high-pressure steam header when the steam pressure in the high-pressure steam header is lower than a preset threshold value; a control switch unit which compares the steam pressure in the high-pressure steam header with the threshold value to switch between control by the low-pressure control unit and control by the high-pressure control unit; a determining unit which determines that a desired steam volume of the steam consuming facility has reached an upper limit value of the volume of steam to be generated by the steam generating facility; and a steam bypass facility control unit which adds a bias value to the bypass steam volume control command value of the steam bypass facility to generate a new bypass steam volume control command value when the determining unit determines that the desired steam volume has reached the upper limit value, in order to control the volume and pressure of the steam passing through the steam bypass facility on the basis of the new bypass steam volume control command value.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic diagram showing the configuration of a power generation/desalination complex plant 100 according to a first embodiment of the present invention;

FIG. 2 is a schematic diagram showing the configurations of control units 170 to 200 in the power generation/desalination complex plant 100 according to the embodiment;

FIG. 3 is a schematic diagram showing the configuration of a gas turbine power generation facility 1201 according to the embodiment;

FIG. 9 is a diagram of the control system configuration of a power generation/desalination complex plant 100T according to a third embodiment of the present invention;

DETAILED DESCRIPTION OF THE INVENTION

Figure 4:
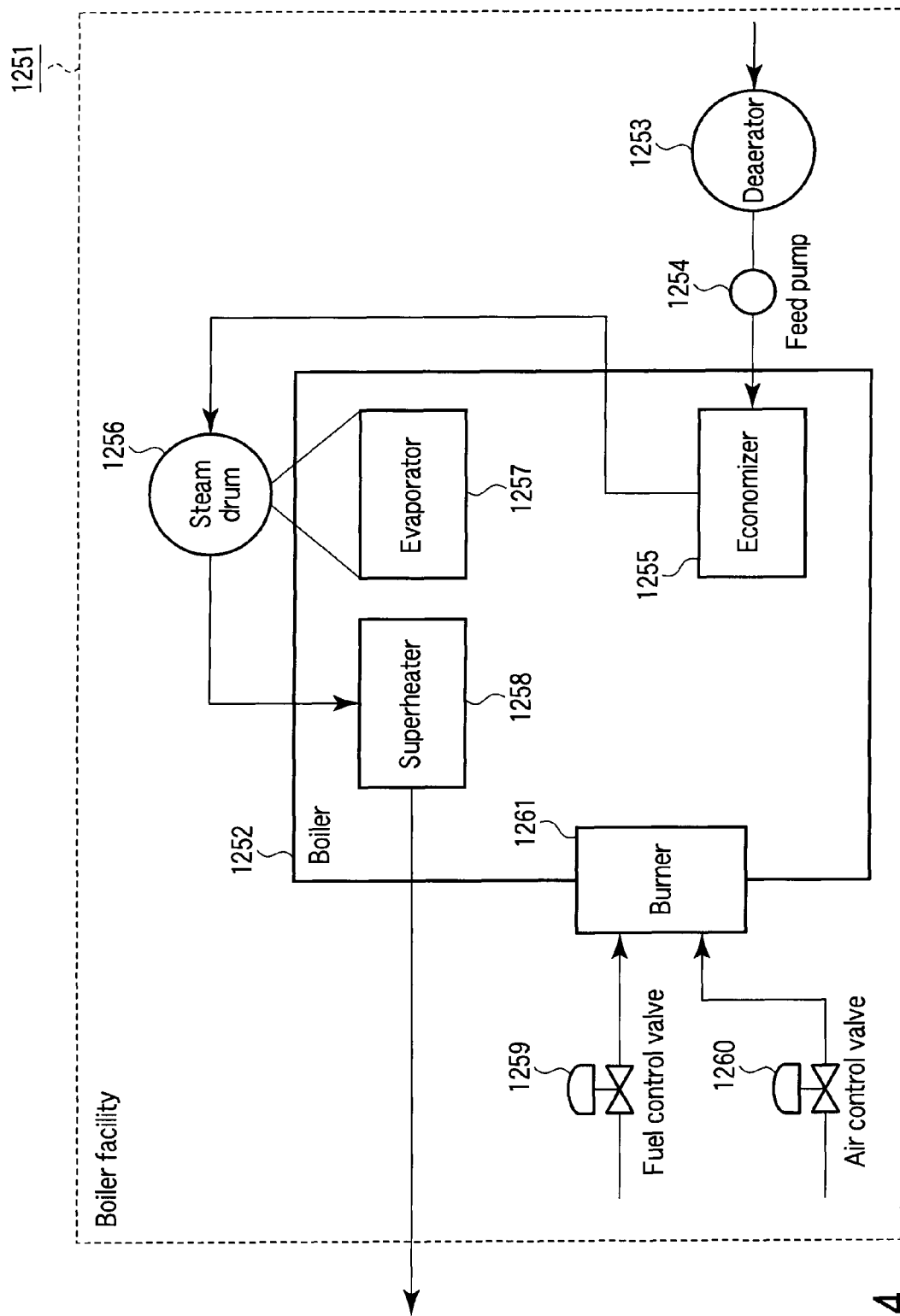
FIG. 4 is a schematic diagram showing the configuration of a boiler facility 1251 according to the embodiment.

Hereinafter, embodiments of the present invention will be described with reference to the drawings. Although a power generation complex plant equipped with a desalination plant, that is, a power generation/desalination plant is described by way of example in the following embodiments of the present invention, the embodiments of the present invention are applicable to a complex plant combining a power generation plant not only with a desalination plant but also with a plant that uses steam as, for example, process steam.

First Embodiment

Configuration of Power Generation/Desalination Complex Plant 100

FIG. 1 is a schematic diagram showing the configuration of a power generation/desalination complex plant 100 according to a first embodiment of the present invention. FIG. 2 is a schematic diagram showing the configurations of control units 170 to 200 in the power generation/desalination complex plant 100. It is to be noted that equal signs are assigned to the same parts as the parts already described and that repetitive explanations may be omitted. Repetitive explanations may be omitted in the following embodiments as well.

The power generation/desalination complex plant 100 comprises a steam consuming facility 110, a steam generating facility 120, a high-pressure steam header 130, a steam turbine power generation facility 140, a low-pressure steam header 150, a steam bypass facility 160, the steam generating facility control unit 170, the regulator valve control unit 180, the overall control unit 190 and the steam bypass facility control unit 200.

In addition, in the power generation/desalination complex plant 100, the pressure in the high-pressure steam header 130 is detected by a pressure detector 210. Moreover, the pressure in the low-pressure steam header 150 is detected by a pressure detector 211.

The steam consuming facility 110 generates product water by using steam from the low-pressure steam header 150 which is supplied with exhaust steam of, for example, the steam turbine power generation facility 140. For example, a desalination facility corresponds to the steam consuming facility 110. In the desalination facility, the steam in the low-pressure steam header 150 is supplied into a heat exchanger, and product water is obtained by evaporating seawater supplied from a seawater system. The steam used for the heat exchange condenses into water. Information on the volume of steam consumed by the steam consuming facility 110 is sent to the steam generating facility 120 as a "desired steam volume".

In addition, a condensing facility 111 may be installed together with the steam consuming facility 110. When more steam flows into the low-pressure steam header 150 than the steam consumed in the steam consuming facility 110, the condensing facility 111 restores this extra steam into condensed water. The condensed water from the steam consuming facility 110 and the condensing facility 111 is reused in, for example, the steam generating facility 120.

The steam generating facility 120 generates a volume of steam desired by the steam consuming facility 110. The steam generating facility 120 is, by way of, for example, an exhaust heat recovery boiler 1206 of a gas turbine power generation facility 1201 shown in FIG. 3, or a boiler facility 1251 shown in FIG. 4.

The gas turbine power generation facility 1201 shown in FIG. 3 generates steam when power is generated in the following manner: In the gas turbine power generation facility 1201 shown in FIG. 3, when a fuel is put in a combustor 1203 of a gas turbine 1202 via a fuel control valve 1204, the gas turbine 1202 is driven by a combustion gas. Accordingly, a gas turbine power generator 1205 coaxially connected with the gas turbine 1202 is driven, such that electric power is obtained. A gas turbine load is controlled by the operation of the fuel control valve 1204. On the other hand, a high-temperature exhaust gas discharged from the gas turbine 1202 is supplied into the exhaust heat recovery boiler 1206. The exhaust heat recovery boiler 1206 reuses the condensed water from the steam consuming facility 110 and the condensing facility 111, and supplies the condensed water to a deaerator 1207. The deaerator 1207 deaerates the condensed water. Steam generated in an evaporator 1208 using the exhaust gas of the gas turbine 1202 as a heat source is used for the deaeration. The deaerated water is pressurized by a feed pump 1209. The pressurized feed water is warmed in an economizer 1210 by exhaust heat of the gas turbine 1202. The warmed feed water is supplied to a steam drum 1211. The water supplied to the steam drum 1211 is evaporated into steam by the exhaust heat of the gas turbine 1202 in an evaporator 1212. The steam from the steam drum 1211 is superheated in a superheater 1213 by the exhaust heat of the gas turbine 1202. Then, the steam at high pressure and high temperature is supplied to the high-pressure steam header 130. When the desired steam volume is more than the volume of steam to be generated by a fuel gas from the gas turbine 1202, a duct burner 1214 as an auxiliary combustor is used to compensate for the steam volume. In addition, the volume of steam to be generated in the duct burner 1214 is adjusted by the opening/closing operation of a fuel control valve 1215. For example, when the fuel control valve 1215 is opened, heat input to the exhaust heat recovery boiler 1206 increases, so that the steam volume is compensated for.

The boiler facility 1251 is a facility in which a burner 1261 is installed in a boiler 1252. The boiler facility 1251 generates steam similarly to the exhaust heat recovery boiler 1206 of the gas turbine power generation facility 1201. This boiler facility 1251 generates steam as follows: First, as shown in FIG. 4, the condensed water from the steam consuming facility 110 and the condensing facility 111 is supplied to a deaerator 1253 of the boiler facility 1251. The supplied condensed water is deaerated by the deaerator 1253. The deaerated water is pressurized by a feed pump 1254. The pressurized feed water is warmed in an economizer 1255 by a fuel gas of the boiler 1252. The warmed feed water is supplied to a steam drum 1256. The water supplied to the steam drum 1256 is evaporated into steam in an evaporator 1257 by the fuel gas of the boiler 1252. The steam from the steam drum 1256 is superheated in a superheater 1258 by the fuel gas of the boiler 1252. Then, the superheated steam is supplied to the high-pressure steam header 130. In addition, a fuel is supplied to the burner 1261 via a fuel control valve 1259, while air is supplied to the burner 1261 via an air control valve 1260. Further, heat energy of the fuel gas generated in the burner 1261 is transmitted to heat exchangers provided in the boiler 1252.

In FIG. 1, the steam generated by the steam generating facility 120 is supplied into the high-pressure steam header 130. Then, the high-pressure steam header 130 supplies the steam therein to the steam turbine power generation facility 140 and the steam bypass facility 160.

The steam turbine power generation facility 140 generates electricity by use of the steam supplied from the high-pressure steam header 130. Specifically, in the steam turbine power generation facility 140, the steam at high pressure and high temperature from the high-pressure steam header 130 is supplied into a steam turbine 142 via a regulator valve 141. Then, a steam turbine power generator 143 coaxially connected with the steam turbine 142 is driven by a driving force generated by the steam turbine 142, thereby obtaining electric power. In addition, the load of the steam turbine 142 varies depending on the position of the regulator valve 141. Moreover, the steam which has worked in the steam turbine 142 turns into steam at relatively low pressure and temperature, and flows to the low-pressure steam header 150.

Steam which has flowed out of the steam turbine power generation facility 140 is supplied into the low-pressure steam header 150. The steam which has been supplied into the low-pressure steam header 150 is supplied to the steam consuming facility 110. In addition, steam flowing out of the steam bypass facility 160 is also supplied into the low-pressure steam header 150.

The steam bypass facility 160 links the high-pressure steam header 130 to the low-pressure steam header 150 in such a manner as to bypass the steam turbine power generation facility 140. Then, the steam bypass facility 160 adjusts the volume, pressure, and temperature of the steam supplied from the high-pressure steam header 130 and then supplies the steam into the low-pressure steam header 150.

Specifically, the steam bypass facility 160 has a bypass valve 161, a bypass spray valve 162 and a temperature decreasing facility 163. The bypass valve 161 adjusts the volume of steam flowing out of the high-pressure steam header 130. Here, the temperature decreasing facility 163 is a component for controlling the temperature so that the temperature of steam at the exit of the steam bypass facility 160 may be appropriate for the steam in the low-pressure steam header 150. The bypass spray valve 162 adjusts the volume of sprayed water taken in from the outside and supplied to the temperature decreasing facility 163. That is, the sprayed water whose flow volume has been adjusted by the bypass spray valve 162 is sprayed in the temperature decreasing facility 163, such that the steam at relatively high temperature in the high-pressure steam header 130 is decreased in temperature, and increased in volume by the supplied sprayed water and then guided to the low-pressure steam header 150. As described above, the steam bypass facility 160 has the bypass spray valve 162 and the temperature decreasing facility 163, and can thus increase the volume of outflow steam.

In addition, the steam bypass facility 160 is used, for example, to operate the steam consuming facility 110 without operating the steam turbine power generation facility 140. For example, the steam bypass facility 160 is used when water is needed but electricity is not needed so much. In other words, the steam bypass facility 160 is on standby as a backup for pressure control of the low-pressure steam header 150.

The steam generating facility control unit 170 controls the steam generating facility 120 on the basis of the steam pressure in the high-pressure steam header 130. Here, the steam generating facility control unit 170 outputs a control command associated with the volume of steam to be generated in the steam generating facility 120 so that the steam pressure in the high-pressure steam header 130 may be at a pressure set value P1. Specifically, the steam generating facility control unit 170 generates a control command value V1 in a pressure control calculator 171 in accordance with a pressure detection value detected in the pressure detector 210 and outputs the control command value V1 to the steam generating facility 120, as shown in FIG. 2. For example, the pressure control calculator 171 performs a calculation based on PID control. In addition, the control command value V1 is, when the steam generating facility 120 is, for example, the gas turbine power generation facility 1201 shown in FIG. 3, a value which indicates a controlled variable corresponding to a flow volume command for a fuel supplied to the duct burner 1214, a command for the position of the fuel control valve 1215 of the duct burner 1214, a flow volume command for a fuel supplied to the combustor 1203, a command for the position of the fuel control valve 1204 of the gas turbine 1202, or a combination of the above. Heat input to the exhaust heat recovery boiler 1206 changes with any of the controlled objects, so that the volume of steam to be generated can be changed, and the pressure of the high-pressure steam header 130 can be controlled.

The regulator valve control unit 180 opens and closes the regulator valve 141 of the steam turbine power generation facility 140 to adjust its position, and thereby controls the volume of steam supplied to the steam turbine power generation facility 140. The regulator valve control unit 180 has a low-pressure controller 181, a high-pressure controller 182, a switch determining unit 183 and a control switch 184, as shown in FIG. 2. The regulator valve control unit 180 controls the regulator valve 141 by forward pressure control or exhaust pressure control.

The low-pressure controller 181 controls (exhaust pressure control) the volume of steam supplied from the high-pressure steam header 130 to the steam turbine power generation facility 140, that is, the position of the regulator valve 141 on the basis of the steam pressure in the low-pressure steam header 150. Specifically, the low-pressure controller 181 generates a control command value V2 in accordance with a deviation between pressure set value P2 and a pressure signal of the low-pressure steam header detected in the pressure detector 211, and outputs the control command value V2 to the control switch 184.

The high-pressure controller 182 controls (forward pressure control) the volume of steam supplied from the high-pressure steam header 130 to the steam turbine power generation facility 140, that is, the position of the regulator valve 141 on the basis of the steam pressure in the high-pressure steam header 130. Specifically, the high-pressure controller 182 generates a control command value V3 in accordance with a deviation between pressure set value P3 and the pressure detection value of the high-pressure steam header detected in the pressure detector 210, and outputs the control command value V3 to the control switch 184.

Here, the volume of steam supplied to the steam turbine power generation facility 140, that is, the position of the regulator valve 141 of the steam turbine power generation facility 140 is controlled by the selected low-pressure controller 181 or high-pressure controller 182. However, this is generally controlled by the low-pressure controller 181 (exhaust pressure control).

The switch determining unit 183 compares the steam pressure in the high-pressure steam header 130 in FIG. 1 with a preset threshold value, and determines whether the steam pressure in the high-pressure steam header 130 is lower than the preset threshold value. Thus, the switch determining unit 183 can determine that the desired steam volume is beyond the maximum volume of steam to be generated by the steam generating facility 120 when the steam pressure in the high-pressure steam header 130 is lower than the threshold value. When determining that the steam pressure in the high-pressure steam header 130 is lower than the threshold value, the switch determining unit 183 sends a "switch command" to the control switch 184. In addition, instead of monitoring the pressure in the high-pressure steam header 130 in FIG. 1, the switch determining unit 183 may monitor the control command value V1 of the steam generating facility control unit 170 determined by the steam pressure in the high-pressure steam header, and send the switch command in accordance with the value of the control command value V1.

The control switch 184 makes a switch from the control by the low-pressure controller 181 to the control by the high-pressure controller 182 when receiving the "switch command" from the switch determining unit 183. The control switch 184 generally adjusts the regulator valve 141 on the basis of the control command value V2 from the low-pressure controller 181, and controls the volume of steam output from the steam turbine power generation facility 140. However, when the "switch command" is sent from the switch determining unit 183, the control switch 184 adjusts the position of the regulator valve 141 on the basis of the control command value V3 from the high-pressure controller 182 to control the volume of steam supplied to the steam turbine power generation facility 140.

In the present embodiment, the overall control unit 190 is further provided, which is another component for determining whether the volume of steam desired by the steam consuming facility 110 has reached an upper limit value of the volume of steam to be generated by the steam generating facility 120.

The overall control unit 190 has an upper limit detector 191 and a lower limit detector 192. The upper limit detector 191 detects whether the control command value V1 of the steam generating facility control unit 170 is equal to or more than a preset upper limit value. When detecting that the control command value V1 of the steam generating facility control unit 170 is equal to or more than the preset upper limit value, the upper limit detector 191 sends, to the steam bypass facility control unit 200, a "bias control signal" for adding an open-side bias value to the control command value for the position of the bypass valve 161 in the steam bypass facility 160. In addition, a situation where the upper limit detector 191 detects that the control command value V1 is equal to or more than the upper limit value corresponds to a situation where the volume of steam desired by the steam consuming facility 110 has exceeded the maximum volume of steam generated by the steam generating facility.

The lower limit detector 192 detects that the control command value V1 of the steam generating facility control unit 170 is equal to or less than a preset lower limit value. When detecting that the control command value V1 of the steam generating facility control unit 170 is equal to or less than the preset lower limit value, the lower limit detector 192 sends, to the steam bypass facility control unit 200, a "bias control signal" for adding a close-side bias value to the control command value for the position of the bypass valve 161 in the steam bypass facility 160.

The steam bypass facility control unit 200 controls the volume and pressure of the steam supplied from the high-pressure steam header 130 to the steam bypass facility 160 by the position of the bypass valve 161. The steam bypass facility control unit 200 also opens and closes the bypass spray valve 162 as well as the bypass valve 161 to control the volume of steam passing through the steam bypass facility 160.

Specifically, the steam bypass facility control unit 200 has a pressure control calculator 201 and a bias calculator 202.

The pressure control calculator 201 outputs a control command value V4 for controlling the bypass valve 161, in accordance with a deviation between pressure set value P4 and the steam pressure in the low-pressure steam header detected in the pressure detector 211.

The bias calculator 202 is a circuit for adding a bias value B1 or B2 to the control command value V4 from the pressure control calculator 201 to generate a new control command value V5 when receiving the "bias control signal" from the overall control unit 190. Here, when the bias control signal is received from the upper limit detector 191, the open-side bias value B1 is added to the control command value V4. When the bias control signal is received from the lower limit detector 192, the close-side bias value B2 is added to the control command value V4, that is, the bias value B2 is subtracted from the opening command value of the bypass valve 161. In addition, the bias values B1, B2 are set at such values that do not cause the control switch 184 to immediately make a switch.

In addition, in the power generation/desalination complex plant 100 according to the present embodiment, both the pressure set value P1 of the steam generating facility control unit 170 and the pressure set value P3 of the regulator valve control unit 180 are pressure set values for the high-pressure steam header 130. Therefore, there is control interference in the case where control is performed simultaneously by both the units. Thus, a control switch method is generally employed so that either the steam generating facility control unit 170 or the regulator valve control unit 180 may perform control. An alternative method to be employed is to set the pressure set value P3 lower than the pressure set value P1. In the present embodiment, while any one of the methods may be employed, the latter method is employed here. This also holds true with the pressure set value P2 of the regulator valve control unit 180 and the pressure set value P4 of the steam bypass facility control unit 200, and the pressure set value P4 is set lower than the pressure set value P2.

Furthermore, in the power generation/desalination complex plant 100 according to the present embodiment, the upper limit detector 191 and the lower limit detector 192 of the overall control unit 190 detect that the volume of steam desired by the steam consuming facility 110 has reached the upper limit and lower limit on the basis of the control command value V1 of the steam generating facility control unit 170. This is however not a limitation. It is also possible to determine that the volume of steam desired by the steam consuming facility 110 has reached the upper limit or lower limit in accordance with the steam pressure in the high-pressure steam header 130 detected in the pressure detector 210.

(Control of Power Generation/Desalination Complex Plant 100)

Next, an outline of the control of the power generation/desalination complex plant 100 according to the present embodiment is described. In addition, in the following explanation, the steam generating facility 120 is the exhaust heat recovery boiler 1206 of the gas turbine power generation facility 1201, and the steam consuming facility 110 is a desalination facility. Thus, two desired values for the amount of power generation and the amount of desalination are independently set in the power generation/desalination complex plant 100. In the power generation/desalination complex plant 100, the position of the fuel control valve 1204 of the gas turbine power generation facility 1201, the position of the regulator valve 141 of the steam turbine power generation facility 140 and the position of the bypass valve 161 of the steam bypass facility 160 are adjusted to satisfy the above-mentioned desired values.

(The Case where the Desired Steam Volume has not Reached the Limit Value of the Volume of Steam to be Generated)

In the case where the volume of steam desired by the steam consuming facility 110 has not reached the limit value of the volume of steam to be generated by the steam generating facility 120, the power generation/desalination complex plant 100 performs the following normal control. In addition, the regulator valve 141 of the steam turbine power generation facility 140 is initially controlled by the low-pressure controller 181 in each case.

(0-1) The Case where Desired Power Generation Amount has Increased

In the power generation/desalination complex plant 100, when a desired power generation amount has increased, the steam generating facility control unit 170 controls to open the fuel control valve 1204 of the gas turbine 1202. The flow volume of the fuel supplied increases if the fuel control valve 1204 is opened, so that the desired power generation amount is satisfied. However, heat input to the exhaust heat recovery boiler 1206 increases if the fuel control valve 1204 is opened. As a result, the volume of steam to be generated from the gas turbine power generation facility 1201 increases. This leads to an excessive steam volume if there is no change in the desired desalination amount. Therefore, in the power generation/desalination complex plant 100, the steam generating facility control unit 170 controls to close the fuel control valve 1215 of the duct burner 1214. This reduces the flow volume of the fuel supplied to the duct burner 1214 and enables a fixed volume of steam flowing into the high-pressure steam header 130.

(0-2) The Case where Desired Power Generation Amount has Decreased

In the power generation/desalination complex plant 100, when a desired power generation amount has decreased, the steam generating facility control unit 170 controls to close the fuel control valve 1204 of the gas turbine 1202. The flow volume of the fuel supplied decreases if the fuel control valve 1204 is closed, so that the volume of the fuel corresponds to the desired power generation amount. However, heat input to the exhaust heat recovery boiler 1206 decreases if the fuel control valve 1204 is closed. As a result, the volume of steam to be generated from the gas turbine power generation facility 1201 decreases. This leads to an insufficient steam volume if there is no change in the desired desalination amount. Therefore, in the power generation/desalination complex plant 100, the steam generating facility control unit 170 controls to open the fuel control valve 1215 of the duct burner 1214. This increases the flow volume of the fuel supplied to the duct burner 1214 and enables a fixed volume of steam to flow into the high-pressure steam header 130.

(0-3) The Case where Desired Desalination Amount has Increased

In the power generation/desalination complex plant 100, when a desired desalination amount has increased, the regulator valve control unit 180 controls to open the regulator valve 141. This makes it possible to compensate for the steam flowing out of the low-pressure steam header 150 and enables a fixed pressure of the low-pressure steam header 150. However, if the regulator valve 141 is opened, the power generation amount in the steam turbine power generator 143 increases, resulting in an excessive power generation amount. Therefore, in the power generation/desalination complex plant 100, the steam generating facility control unit 170 controls to close the fuel control valve 1204 of the gas turbine 1202. The flow volume of the fuel supplied decreases if the fuel control valve 1204 is closed. Thus, an increase in the power generation amount in the steam turbine power generator 143 is compensated by a decrease in the power generation amount of the gas turbine power generator 1205, which enables a fixed power generation amount in the whole power generation/desalination complex plant.

If the regulator valve 141 is opened, the steam flowing out of the high-pressure steam header 130 increases. Moreover, if the fuel control valve 1204 of the gas turbine 1202 is closed, heat input to the exhaust heat recovery boiler 1206 decreases, and the volume of steam flowing into the high-pressure steam header 130 also decreases accordingly. This results in an insufficient steam volume in the power generation/desalination complex plant 100. Therefore, in the power generation/desalination complex plant 100, the steam generating facility control unit 170 controls to open the fuel control valve 1215 of the duct burner 1214. This makes it possible to compensate for the insufficient steam volume and enables a fixed pressure of the high-pressure steam header 130.

(0-4) The Case where Desired Desalination Amount has Decreased

In the power generation/desalination complex plant 100, when a desired desalination amount has decreased, the regulator valve control unit 180 controls to close the regulator valve 141. This prevents a rise in the pressure of the low-pressure steam header 150 and enables a fixed pressure of the low-pressure steam header 150.

However, if the regulator valve 141 is closed, the power generation amount in the steam turbine power generator 143 decreases, resulting in an insufficient power generation amount. Therefore, in the power generation/desalination complex plant 100, the steam generating facility control unit 170 controls to open the fuel control valve 1204 of the gas turbine 1202. The flow volume of the fuel supplied increases if the fuel control valve 1204 is opened. Thus, a decrease in the power generation amount in the steam turbine power generator 143 is compensated by an increase in the power generation amount of the gas turbine power generator 1205, which enables a fixed power generation amount in the whole power generation/desalination complex plant.

If the regulator valve 141 is closed, the volume of steam flowing out of the high-pressure steam header 130 decreases. Moreover, if the fuel control valve 1204 of the gas turbine 1202 is opened, heat input to the exhaust heat recovery boiler 1206 increases, and the volume of steam flowing into the high-pressure steam header 130 also increases accordingly. This results in an excessive steam volume in the power generation/desalination complex plant 100. Therefore, in the power generation/desalination complex plant 100, the steam generating facility control unit 170 controls to close the fuel control valve 1215 of the duct burner 1214. This decreases the flow volume of the fuel supplied, eliminates the excessive steam volume, and enables a fixed pressure of the high-pressure steam header 130.

(The Case where the Desired Steam Volume has Reached the Limit Value of the Volume of Steam to be Generated)

In the power generation/desalination complex plant 100, no problem occurs with the above-mentioned normal control when a desired power generation amount is balanced with a desired desalination amount. However, the volume of steam desired by the steam consuming facility 110 may reach the limit value of the volume of steam to be generated by the steam generating facility 120. In such a case, there is a need for supplementary steam from the outside or the release of steam to the outside.

For example, when there is a great demand for water in summer, a steam volume exceeding the maximum volume of steam to be generated by the steam generating facility 120 may be desired by the steam consuming facility 110. In such a case, supplementary steam for the insufficiency is supplied from the outside via the bypass spray valve 162 of the steam bypass facility 160.

However, in the transitional state before the supplementary steam is supplied from the bypass spray valve 162, the desired steam volume cannot be satisfied in spite of the duct burner 1214 at the maximum output. As a result, the pressure of the high-pressure steam header 130 may drop with increasing speed.

In such a case, the control switch 184 generally makes a switch from the control by the low-pressure controller 181 to the control by the high-pressure controller 182.

On the contrary, the following control is performed in the power generation/desalination complex plant 100 according to the present embodiment.

(1-1) Excessive Increase in Desired Desalination Amount

Figure 5:
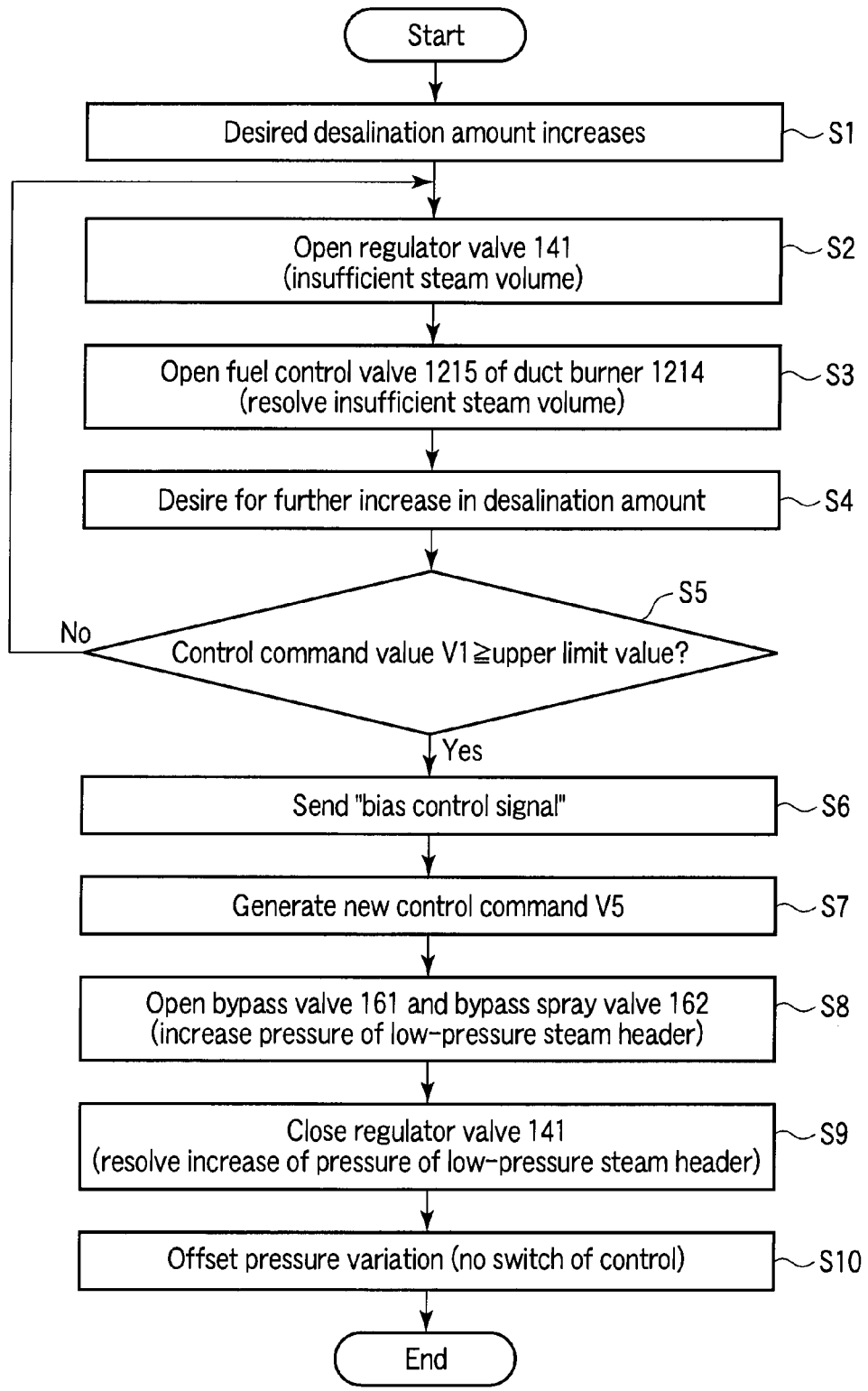
FIG. 5 is a flowchart for explaining an outline of the control of the power generation/desalination complex plant 100 according to the embodiment.

FIG. 5 is a flowchart for explaining an outline of the control of the power generation/desalination complex plant 100 according to the present embodiment.

In the power generation/desalination complex plant 100, when only the desired desalination amount has increased, the steam pressure in the low-pressure steam header 150 decreases. Thus, the regulator valve control unit 180 controls to open the regulator valve 141 on the basis of the decrease of the steam pressure detected in the pressure detector 211 (steps S1, S2). This makes it possible to compensate for the steam flowing from the low-pressure steam header 150 to the steam consuming facility 110.

However, if the regulator valve 141 is opened, the pressure of the high-pressure steam header 130 decreases. This results in an insufficient volume of steam for desalination.

Thus, in the power generation/desalination complex plant 100, the steam generating facility control unit 170 controls to open the fuel control valve 1215 of the duct burner 1214 on the basis of the decrease of the pressure of the high-pressure steam header 130 detected in the pressure detector 210 (step S3). This makes it possible to compensate for the insufficient steam volume and enables a fixed pressure of the high-pressure steam header 130.

Subsequently, if there is a desire for a further increase in the desalination amount, the volume of steam desired by the steam consuming facility 110 may exceed the maximum volume of steam to be generated by the steam generating facility 120 (step S4). In such a case, the upper limit detector 191 of the overall control unit 190 detects that the control command value V1 for the steam generating facility control unit 170 is equal to or more than a preset upper limit value (step S5-Yes).

When the upper limit detector 191 detects that the control command value V1 is equal to or more than the upper limit value, the "bias control signal" is sent from the upper limit detector 191 to the steam bypass facility control unit 200 (step S6).

When the steam bypass facility control unit 200 receives the bias control signal, the bias calculator 202 generates a new control command value V5 in which an open-side bias value B1 is added at a fixed rate to a control command value V4 output from the pressure control calculator 201 (step S7).

Then, the steam bypass facility control unit 200 controls to open the bypass valve 161 and the bypass spray valve 162 of the steam bypass facility 160 in accordance with the new control command value V5 (step S8). In short, the bypass valve 161 and the bypass spray valve 162 of the steam bypass facility 160 are opened by the steam bypass facility control unit 200 before a switch is made from the control by the low-pressure controller 181 to the control by the high-pressure controller 182.

When the bypass valve 161 is opened, the pressure of the low-pressure steam header 150 rises. Thus, the regulator valve control unit 180 closes the regulator valve 141 (step S9). As a result, a rise in the pressure of the low-pressure steam header 150 is avoided. In addition, high-temperature steam increases if the bypass valve 161 is opened, so that low-temperature sprayed water from the bypass spray valve 162 is increased.

The bypass valve 161 and the bypass spray valve 162 are opened and the regulator valve 141 is closed as described above, and after a certain period of time, a pressure variation is offset in the high-pressure steam header 130 (step S10). Consequently, there is no switch from the control by the low-pressure controller 181 to the control by the high-pressure controller 182.

Additionally, the volume of steam to be generated from the steam generating facility 120 remains unchanged in the power generation/desalination complex plant 100. Thus, a variation in the steam volume made when the desired desalination amount has changed is compensated by the sprayed water supplied to the steam bypass facility 160. For example, when the desalination amount has increased by α, the bypass valve 161 and the bypass spray valve 162 are kept open until the sprayed water increases by α. Then, the regulator valve 141 is controlled to be open until the effect of an increase β in the volume of passing steam made by opening the bypass valve 161 is offset.

In addition, due to the addition of the sprayed water from the bypass spray valve 162, a decrease in the volume of steam passing through the regulator valve 141 will finally surpass an increase in the volume of steam passing through the bypass valve 161. Then, the pressure of the high-pressure steam header 130 rises. Thus, the steam generating facility control unit 170 controls to close the fuel control valve 1215 of the duct burner 1214 and the fuel control valve 1204 of the gas turbine 1202. This decreases the volume of steam to be generated in the steam generating facility 120 and thereby allows a fixed pressure of the high-pressure steam header 130.

(1-2) Excessive Decrease in Desired Desalination Amount

Figure 6:
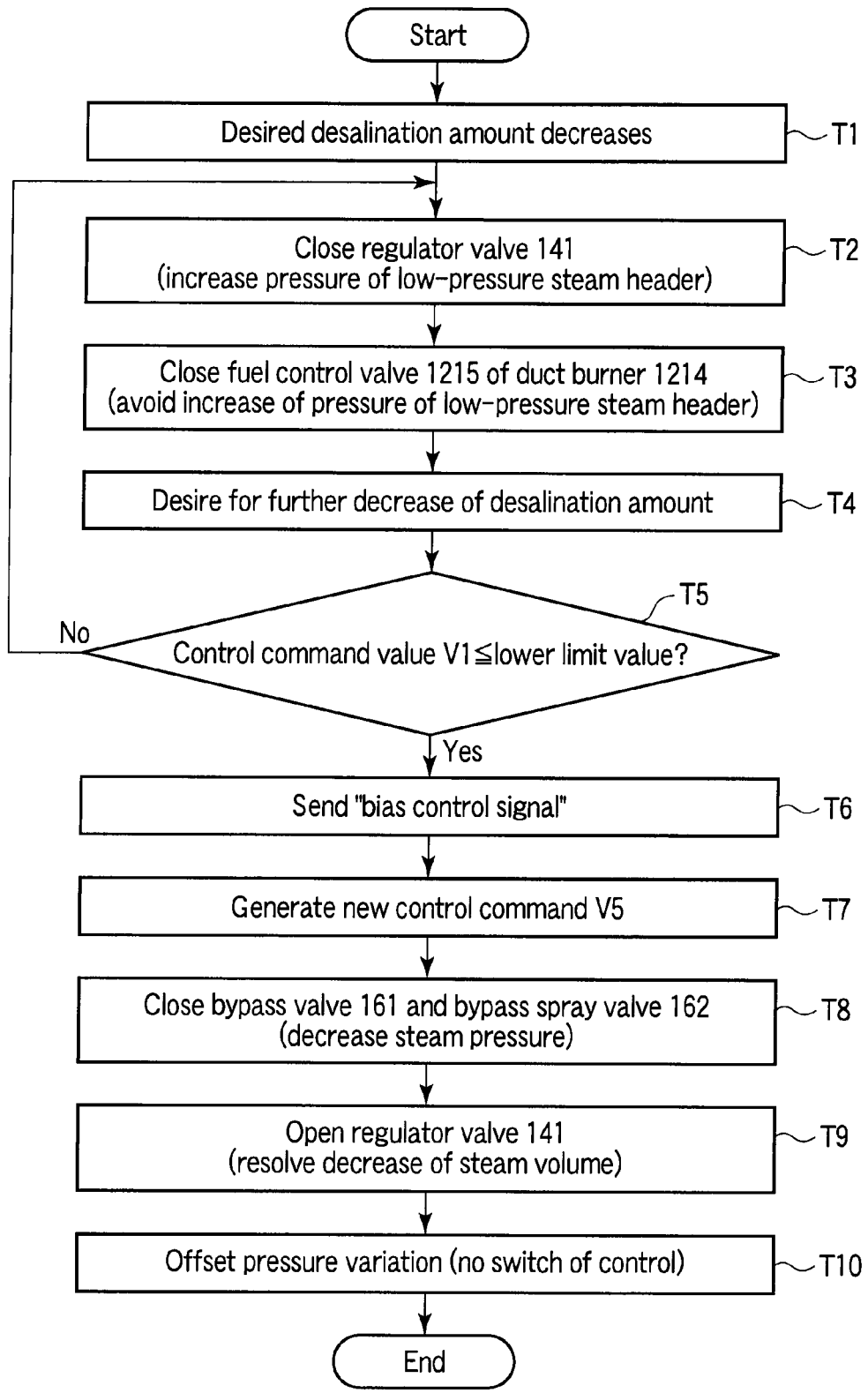
FIG. 6 is a flowchart for explaining an outline of the control of the power generation/desalination complex plant 100 according to the embodiment.

In the power generation/desalination complex plant 100, it is also possible to make no switch from the control (exhaust pressure control) by the high-pressure controller 182 to the control (forward pressure control) by the low-pressure controller 181, as shown in FIG. 6.

In the power generation/desalination complex plant 100, when the desired desalination amount has decreased, the steam pressure in the low-pressure steam header 150 increases. Thus, the regulator valve control unit 180 controls to close the regulator valve 141 on the basis of the increase of the steam pressure detected in the pressure detector 211 (steps T1, T2). As a result, a rise in the pressure of the low-pressure steam header 150 is avoided.

However, the pressure of the high-pressure steam header 130 rises if the regulator valve 141 is closed.

Thus, in the power generation/desalination complex plant 100, the steam generating facility control unit 170 controls to close the fuel control valve 1215 of the duct burner 1214 on the basis of the increase of the pressure of the high-pressure steam header 130 detected in the pressure detector 210 (step T3). This reduces the steam volume and enables a fixed pressure of the high-pressure steam header 130.

Subsequently, if there is a desire for a further decrease in the desalination amount (step T4), the lower limit detector 192 of the overall control unit 190 detects that the control command value V1 for the steam generating facility control unit 170 is equal to or less than the preset lower limit value (step T5-Yes).

When the lower limit detector 192 detects that the control command value V1 is equal to or less than the lower limit value, the "bias control signal" is sent from the lower limit detector 192 to the steam bypass facility control unit 200 (step T6).

When the steam bypass facility control unit 200 receives the bias control signal, the bias calculator 202 generates a new control command value V5 in which a close-side bias value B2 is added at a fixed rate to a control command value V4 output from the pressure control calculator 201 (step T7).

Then, the steam bypass facility control unit 200 controls to close the bypass valve 161 and the bypass spray valve 162 of the steam bypass facility 160 in accordance with the new control command value V5 (step T8). That is, the bypass valve 161 and the bypass spray valve 162 of the steam bypass facility 160 are closed by the steam bypass facility control unit 200 before a switch is made from the control by the high-pressure controller 182 to the control by the low-pressure controller 181.

When the bypass valve 161 is closed, the pressure of the low-pressure steam header 150 drops. Thus, the regulator valve control unit 180 opens the regulator valve 141 to increase the pressure of the low-pressure steam header 150 (step T9). In addition, high-temperature steam decreases if the bypass valve 161 is closed. Therefore, low-temperature sprayed water supplied from the bypass spray valve 162 is decreased.

The bypass valve 161 and the bypass spray valve 162 are closed and the regulator valve 141 is closed as described above, and after a certain period of time, a pressure variation is offset in the high-pressure steam header 130 (step T10). Consequently, there is no switch from the control by the high-pressure controller 182 to the control by the low-pressure controller 181.

In addition, due to the decrease of the sprayed water from the bypass spray valve 162, an increase in the volume of steam passing through the regulator valve 141 will finally surpass a decrease in the volume of steam passing through the bypass valve 161. Then, the pressure of the high-pressure steam header 130 drops. Thus, the steam generating facility control unit 170 controls to open the fuel control valve 1215 of the duct burner 1214 and the fuel control valve of the gas turbine 1202. This increases the volume of steam to be generated in the steam generating facility 120 and thereby allows a fixed pressure of the high-pressure steam header 130.

(Effect of Power Generation/Desalination Complex Plant)

As described above, the power generation/desalination complex plant 100 according to the present embodiment comprises the overall control unit 190 for determining from the steam pressure in the high-pressure steam header 130 that the desired steam volume has reached the limit value of the volume of steam to be generated by the steam generating facility 120, and the steam bypass facility control unit 200 for adding the bias value B1 to the control command value V4 for the normal steam bypass facility 160 to generate a new control command value V5 when the overall control unit 190 determines that the desired steam volume has reached the limit value, and controlling the volume and pressure of the steam passing through the steam bypass facility 160 on the basis of the new control command value V5. Consequently, it is possible to make no switch between the control by the low-pressure controller 181 and the control by the high-pressure controller 182, thus enabling higher stability and control response.

Hence, the advantage of the power generation/desalination complex plant 100 is to be able to constantly maintain equal controllability and also to be able to expand the range of operation.

The power generation/desalination complex plant 100 is also able to expand the range of operations of the steam turbine power generation facility 140 and the gas turbine power generation facility 1201 by increasing the sprayed water via the temperature decreasing facility 163 and thus increasing the volume of steam to be generated.

Furthermore, the power generation/desalination complex plant 100 can open the bypass valve 161 to decrease the volume of steam to be generated by the steam generating facility 120, so that the pressure of the high-pressure steam header 130 can be continuously controlled by the steam generating facility control unit 170.

Moreover, in the power generation/desalination complex plant 100 according to the present embodiment, a combination of the gas turbine power generation facility 1201 and the boiler facility 1251 may be used as the steam generating facility 120. For example, such a combination may be used so that the fuel control valve 1259 of the boiler 1252 starts controlling the high-pressure steam header 130 when the fuel control valve 1215 of the duct burner 1214 has reached the maximum output. However, the duct burner 1214 is different in control response from the boiler 1252, so that it is necessary to place different restrictions on the rates of changes in the power generation amount and the desalination amount.

In addition, in the power generation/desalination complex plant 100 according to the present embodiment, the steam generating facility 120, the steam turbine power generation facility 140, the steam bypass facility 160, the steam consuming facility 110 and the condensing facility 111 can be adjusted in number to the size of a plant and combined in any manner.

Second Embodiment

Configuration of Power Generation/Desalination Complex Plant 100S

Figure 7:
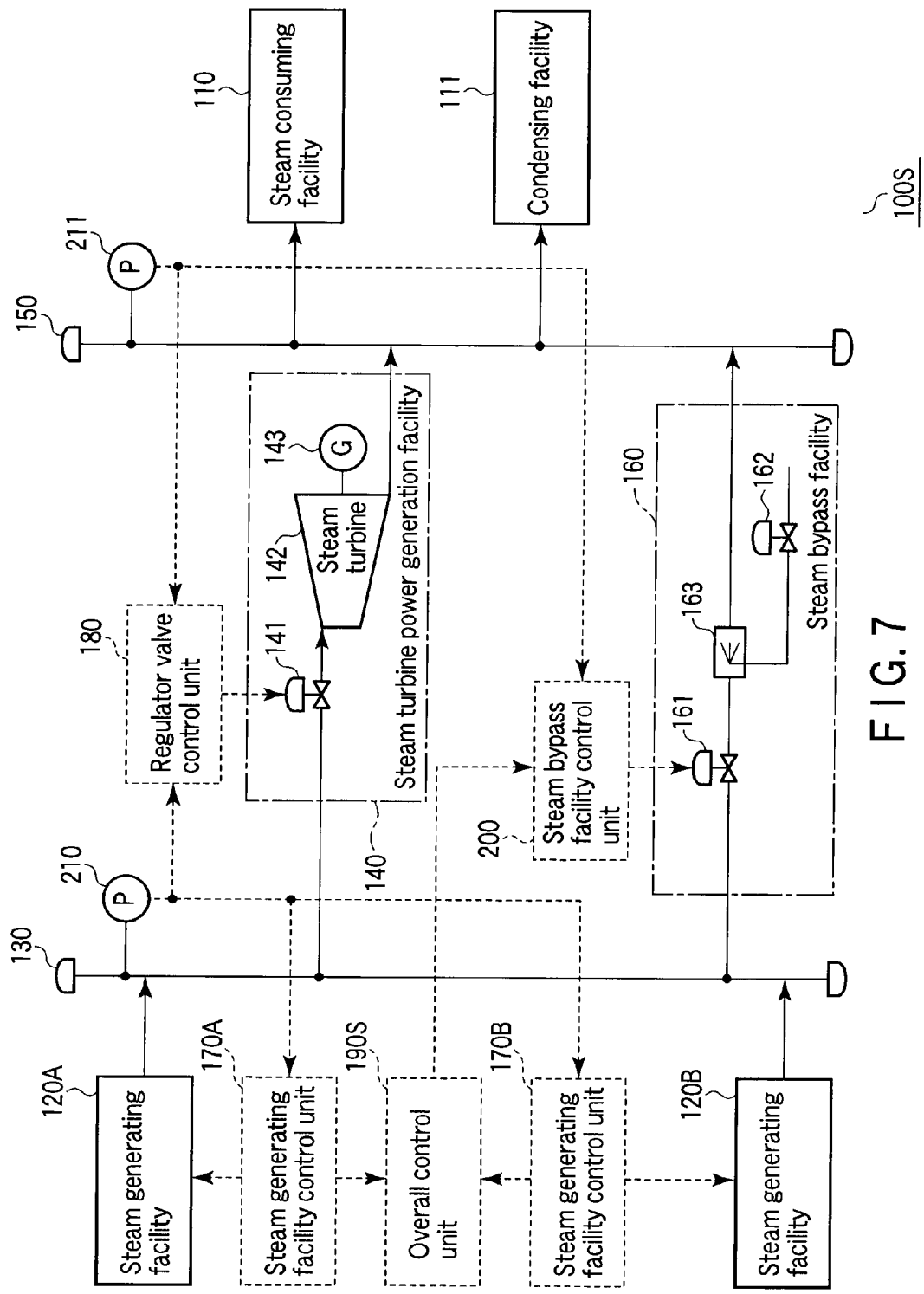
FIG. 7 is a schematic diagram showing the configuration of a power generation/desalination complex plant 100S according to a second embodiment of the present invention.
Figure 8:
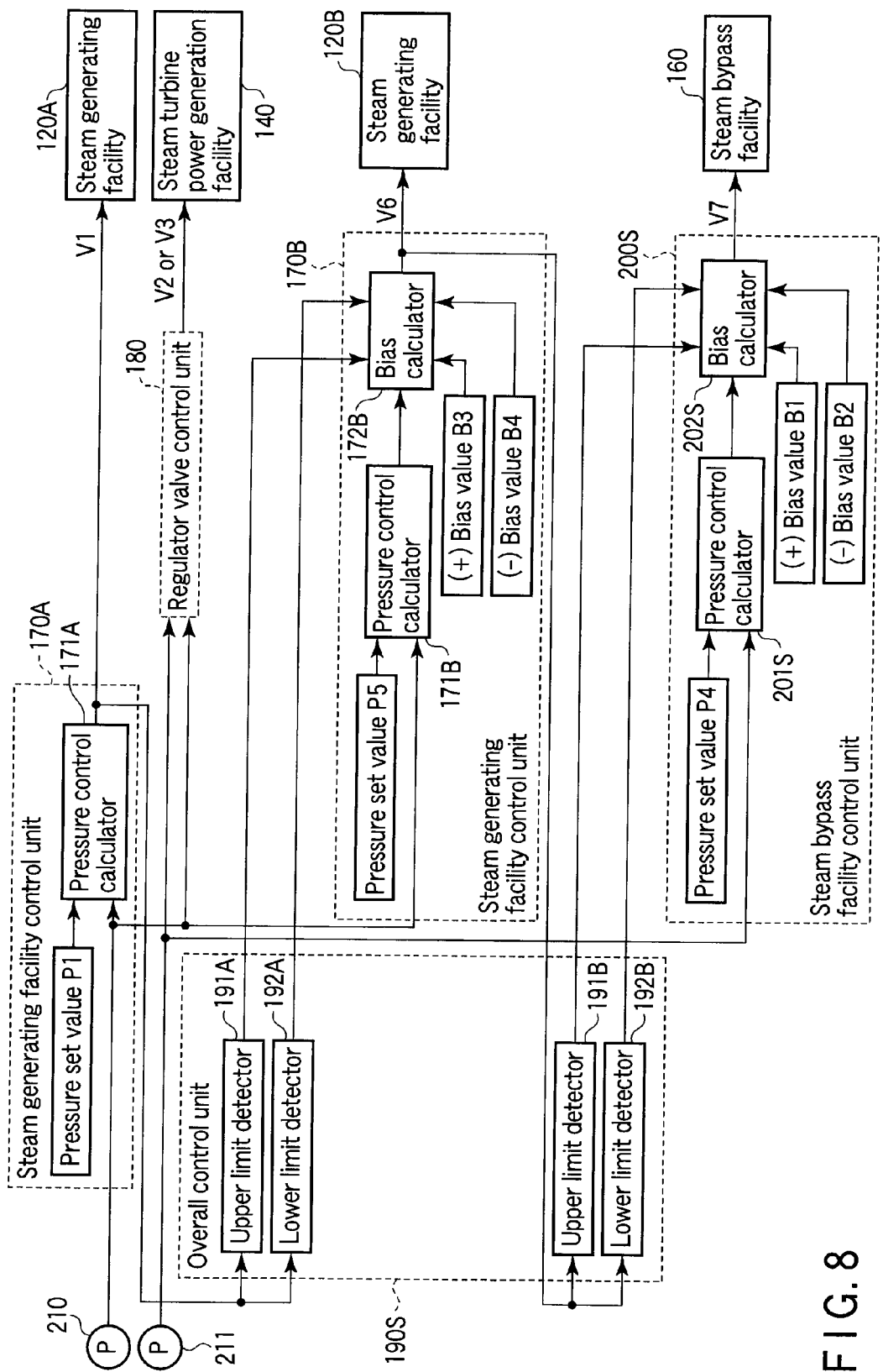
FIG. 8 is a diagram of the control system configuration of the power generation/desalination complex plant 100S according to the embodiment.

FIG. 7 is a schematic diagram showing the configuration of a power generation/desalination complex plant 100S according to a second embodiment of the present invention. FIG. 8 is a diagram of the control system configuration of the power generation/desalination complex plant 100S. An explanation is given below with FIGS. 7 and 8.

The power generation/desalination complex plant 100S according to the present embodiment is obtained by providing a plurality of steam generating facilities 120A, 120B in the power generation/desalination complex plant 100 according to the first embodiment. In this power generation/desalination complex plant 100S, steam generated by the steam generating facilities 120A, 120B is supplied into a high-pressure steam header 130. Thus, an overall control unit 190S controls not only a steam bypass facility 160 but also the volume of steam from the steam generating facility 120B, and thereby adjusts the volume of steam from the steam generating facility 120A.

The overall control unit 190S has an upper limit detector 191A for detecting that a control command value V1 of a steam generating facility control unit 170A is equal to or more than a given threshold value, and a lower limit detector 192A for detecting that the control command value V1 is equal to or less than a given threshold value.

A bias calculator 172B is added to a steam generating facility control unit 170B. The bias calculator 172B is a circuit for adding an open-side bias value B3 and a close-side bias value B4 to a calculation depending on the state of signals of the upper limit detector 191A and the lower limit detector 192A of the overall control unit 190S input to this bias calculator 172B in order to calculate a proper control command value V6. The overall control unit 190S further has an upper limit detector 191B for detecting that the control command value V6 of the steam generating facility control unit 170B input thereto is equal to or more than a given threshold value, and a lower limit detector 192B for detecting that the control command value V6 is equal to or less than a given threshold value.

A bias calculator 202S is added to a steam bypass facility control unit 200S. The bias calculator 202S adds an open-side bias value B1 and a close-side bias value B2 to a calculation depending on the state of signals of the upper limit detector 191B and the lower limit detector 192B of the overall control unit 190S input to this bias calculator 202S in order to calculate a proper control command value V7.

(Control of Power Generation/Desalination Complex Plant 100S)

Next, an outline of the control of the power generation/desalination complex plant 100S according to the present embodiment is described. Here, the steam generating facility 120A is the exhaust heat recovery boiler 1206 of the gas turbine power generation facility 1201 shown in FIG. 3, and the steam generating facility 120B is the boiler facility 1251 shown in FIG. 4.

(2-1) Excessive Increase in Desired Desalination Amount

When a desired desalination amount in the power generation/desalination complex plant 100S has increased, an excessive steam volume is desired by a steam consuming facility 110. In this case, the pressure of a low-pressure steam header 150 drops, so that a regulator valve 141 is opened to ensure the volume of steam to the steam consuming facility 110. At the same time, the pressure of the high-pressure steam header 130 also drops, and the control command value V1 of the steam generating facility control unit 170A rises accordingly. Thus, a fuel control valve 1215 of a duct burner 1214 or a fuel control valve 1204 of a gas turbine 1202 increases the fuel to ensure the volume of steam to be generated.

If an additional steam volume is desired, the upper limit detector 191A detects an upper limit value, and the overall control unit 190S transmits a bias control signal to the bias calculator 172B of the steam generating facility control unit 170B. The bias calculator 172B adds the open-side bias value B3 to, for example, the output of a pressure control calculator 171B at a fixed rate, such that the control command value can be increased, and the volume of steam to be generated by the steam generating facility 120B is increased. The pressure of the high-pressure steam header 130 rises together with the increase of steam generated by the boiler. Thus, the fuel control valve 1215 of the duct burner 1214 or the fuel control valve 1204 of the gas turbine 1202 decreases the fuel to decrease the volume of steam to be generated by the steam generating facility 120A.

If an additional steam volume is desired, the upper limit detector 191B detects an upper limit value, and the overall control unit 190S transmits a bias control signal to the bias calculator 202S of the steam bypass facility control unit 200S. The subsequent operations are similar to the operation in the power generation/desalination complex plant 100 according to the first embodiment.

(2-2) Excessive Decrease in Desired Desalination Amount

When a desired desalination amount in the power generation/desalination complex plant 100S has decreased, the volume of steam desired by the steam consuming facility 110 decreases. In this case, the pressure of the low-pressure steam header 150 rises, so that the regulator valve 141 is closed to control the volume of steam to the steam consuming facility 110. At the same time, the pressure of the high-pressure steam header 130 also rises, and the control command value V1 of the steam generating facility control unit 170A drops accordingly. Thus, the fuel control valve 1215 of the duct burner 1214 or the fuel control valve 1204 of the gas turbine 1202 decreases the fuel to keep the balance of the volume of steam to be generated.

If the steam volume further decreases, the lower limit detector 192A detects a lower limit value, and the overall control unit 190S transmits a bias control signal to the bias calculator 172B of the steam generating facility control unit 170B. The bias calculator 172B adds the close-side bias value B4 to, for example, the output of the pressure control calculator 171B at a fixed rate, such that the control command value can be decreased, and the volume of steam to be generated by the steam generating facility 120B is decreased. The pressure of the high-pressure steam header 130 drops together with the decrease of steam generated by the boiler. Thus, the fuel control valve 1215 of the duct burner 1214 or the fuel control valve 1204 of the gas turbine 1202 increases the fuel to increase the volume of steam to be generated by the steam generating facility 120A.

If the steam volume further decreases, the lower limit detector 192B detects a lower limit value, and the overall control unit 190S transmits a bias control signal to the bias calculator 202S of the steam bypass facility control unit 200S. The subsequent operations are similar to the operation in the power generation/desalination complex plant 100 according to the first embodiment.

(Effect of Power Generation/Desalination Complex Plant 100S)

As described above, the power generation/desalination complex plant 100S according to the present embodiment has the steam generating facility control unit 170B. When the overall control unit 190S determines that the desired steam volume has reached the limit value of the volume of steam to be generated, the steam generating facility control unit 170B adds a bias value to the control command value for the other steam generating facility 120B to generate a new control command value V6, and controls the volume of steam to be generated by the other steam generating facility 120B on the basis of the new control command value V6. Consequently, no switch can be made in a control switch 184.

In other words, in the power generation/desalination complex plant 100S according to the present embodiment, the bias value B3 is added to the control command value V6 of the steam generating facility control unit 170B when the control command value of the steam generating facility control unit 170B has reached the maximum load, so that steam to be generated can be increased and the volume of steam to be generated in the steam generating facility 120A can be decreased. As a result, the pressure of the high-pressure steam header 130 can be continuously controlled by the steam generating facility control unit 170A.

Furthermore, in the present embodiment, the bypass valve 161 can be opened to increase the sprayed water provided to a temperature decreasing facility 163, to increase steam to be generated, and to expand the range of operation. Moreover, the bypass valve 161 can be closed to decrease the volume of steam to be generated in the steam generating facility 120A, and the control command value V1 drops accordingly. That is, the pressure of the high-pressure steam header 130 can be continuously controlled by the steam generating facility control unit 170A.

Thus, the power generation/desalination complex plant 100S according to the present embodiment has the advantage of being capable of operation which allows equal controllability to be maintained with no complicated switch of control, and also has the advantage of being capable of expanding the range of operation.

Third Embodiment

FIG. 9 is a diagram of the control system configuration of a power generation/desalination complex plant 100T according to a third embodiment of the present invention.

In the power generation/desalination complex plant 100T according to the present embodiment, an overall control unit 190T has a priority order selector 193. In the overall control unit 190T, a control command value V7 of a steam bypass facility control unit 200 and a priority signal of the priority order selector 193, as well as a signal of a control command value V1 of a steam generating facility control unit 170A, are input to an upper limit detector 191A and a lower limit detector 192A. The "priority signal" is preset to give priority to either the control of the steam bypass facility 160 or the control of the other steam generating facility 120B. Here, an operator, for example, can set a priority order.

Furthermore, in the overall control unit 190T, the control command value V1 of the steam generating facility control unit 170A and the priority signal of the priority order selector 193, as well as a control command value V6 of a steam generating facility control unit 170B, are input to an upper limit detector 191B and a lower limit detector 192B.

Next, the operation of the power generation/desalination complex plant 100T according to the present embodiment is described. In addition, it is premised that the control of the steam generating facility 120B is given priority over the control of the steam bypass facility 160 when the "priority signal" is "1", while the control of the steam bypass facility 160 is given priority over the control of the steam generating facility 120B when the "priority signal" is "2".

Based on such a premise, the upper limit detector 191A determines whether the control command value V1 of the steam generating facility control unit 170A alone has reached an upper limit value when the priority order determined by the priority order selector 193 is "1". If the control command value V1 is equal to or more than the upper limit value, the upper limit detector 191A transmits a bias control signal to a bias calculator 172B of the steam generating facility control unit 170B. When the priority order is "2", the upper limit detector 191A not only determines the control command value V1 of the steam generating facility control unit 170A but also determines whether the control command value V7 of the steam bypass facility control unit 200 has reached the upper limit value. If both the control command value V7 of the steam bypass facility control unit 200 and the control command value V1 of the steam generating facility control unit 170A are equal to or more than the upper limit value, the upper limit detector 191A transmits the bias control signal to the bias calculator 172B of the steam generating facility control unit 170B.

On the other hand, when the priority order determined by the priority order selector 193 is "2", the upper limit detector 191B determines whether the control command value V1 of the steam generating facility control unit 170A alone has reached the upper limit value. If the control command value V1 is equal to or more than the upper limit value, the upper limit detector 191B transmits a bias control signal to a bias calculator 202 of the steam bypass facility control unit 200. When the priority order is "1", the upper limit detector 191B not only determines the control command value V1 of the steam generating facility control unit 170A but also determines whether the control command value V6 of the steam generating facility control unit 170B has reached the upper limit value. If both the control command value V1 of the steam generating facility control unit 170A and the control command value V6 of the steam generating facility control unit 170B are equal to or more than the upper limit value, the upper limit detector 191B transmits a bias control signal to the bias calculator 202 of the steam bypass facility control unit 200.

Moreover, the lower limit detector 192A determines whether the control command value V1 of the steam generating facility control unit 170A alone is equal to or less than a lower limit value when the priority order determined by the priority order selector 193 is "1". If the control command value V1 is equal to or less than the lower limit value, the lower limit detector 192A transmits a bias control signal to the bias calculator 172B of the steam generating facility control unit 170B. When the priority order is "2", the lower limit detector 192A not only determines the control command value V1 of the steam generating facility control unit 170A but also determines whether the control command value V7 of the steam bypass facility control unit 200 is equal to or less than the lower limit value. If both the control command value V7 of the steam bypass facility control unit 200 and the control command value V1 of the steam generating facility control unit 170A are equal to or less than the lower limit value, the lower limit detector 192A transmits the bias control signal to the bias calculator 172B of the steam generating facility control unit 170B.

On the other hand, when the priority order determined by the priority order selector 193 is "2", the lower limit detector 192B determines whether the control command value V1 of the steam generating facility control unit 170A alone has reached the lower limit value. If the control command value V1 is equal to or less than the lower limit value, the lower limit detector 192B transmits a bias control signal to the bias calculator 202 of the steam bypass facility control unit 200. When the priority order is "1", the lower limit detector 192B not only determines the control command value V1 of the steam generating facility control unit 170A but also determines whether the control command value V6 of the steam generating facility control unit 170B has reached a threshold value. If both the control command value V1 of the steam generating facility control unit 170A and the control command value V6 of the steam generating facility control unit 170B are equal to or less than the lower limit value, the lower limit detector 192B transmits a bias control signal to the bias calculator 202 of the steam bypass facility control unit 200.

As described above, the power generation/desalination complex plant 100T according to the present embodiment comprises the priority order selector 193. The priority order selector 193 selects either the control by the steam generating facility control unit 170B or the control by the steam bypass facility control unit 200 in accordance with the preset priority order when the overall control unit 190T determines that a desired steam volume has reached the limit value of the volume of steam to be generated. Consequently, the operation efficiency of the whole power generation/desalination complex plant can be increased.

In short, in the power generation/desalination complex plant 100T according to the present embodiment, a facility to send the bias control signal to can be selected in consideration of, for example, the operation efficiency of the plant at the time, thereby enabling operation with high plant efficiency in addition to the effects of the power generation/desalination complex plant 100S according to the second embodiment. In addition, the priority order of controlling the facilities may be preset or may be determined by the operator.

Fourth Embodiment

Figure 10:
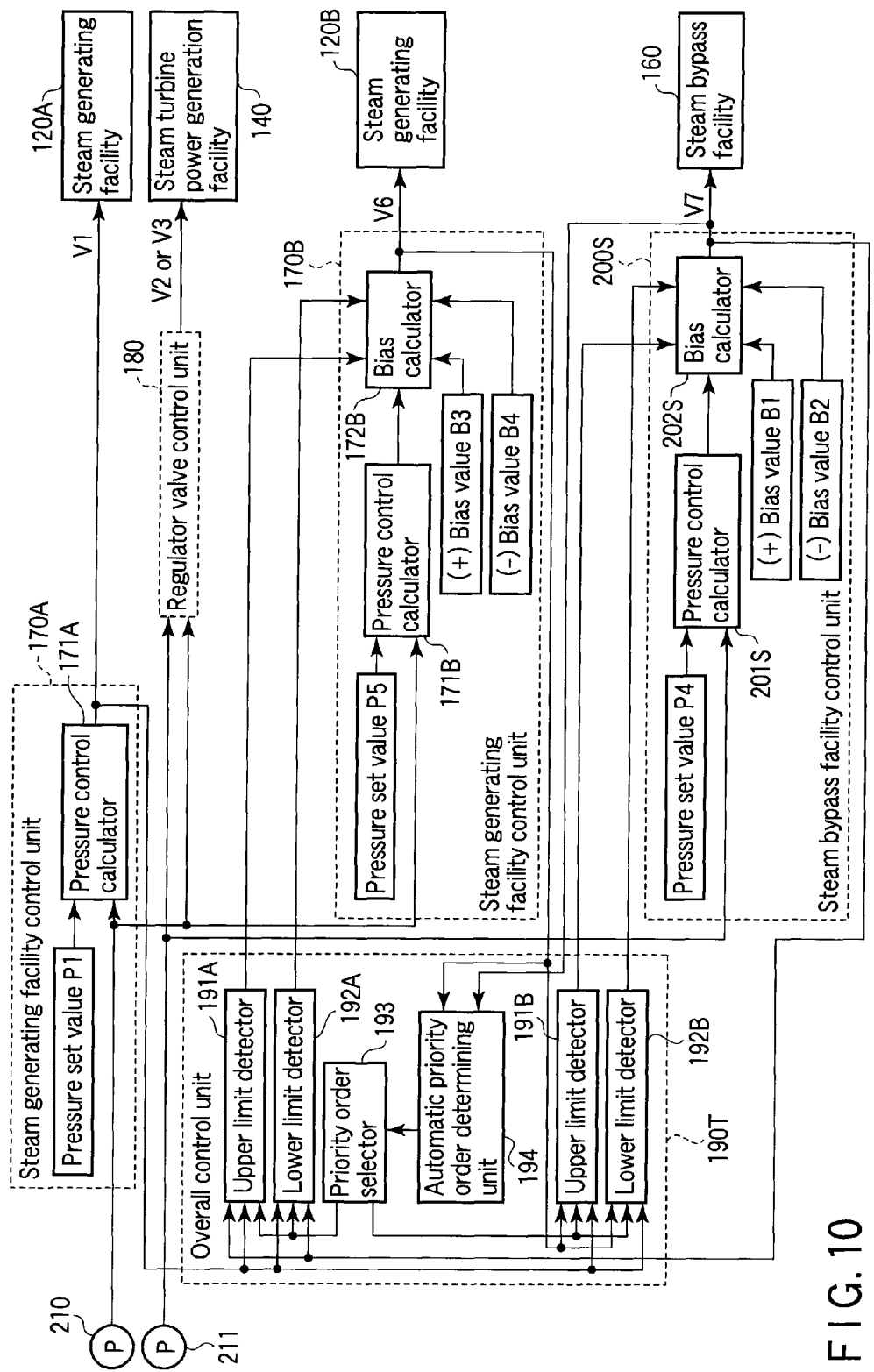
FIG. 10 is a diagram of the control system configuration of a power generation/desalination complex plant 100U according to a fourth embodiment of the present invention.

FIG. 10 is a diagram of the control system configuration of a power generation/desalination complex plant 100U according to a fourth embodiment of the present invention.

In the power generation/desalination complex plant 100U according to the present embodiment, an overall control unit 190U has an automatic priority order determining unit 194.

This automatic priority order determining unit 194 automatically calculates a plant efficiency to "automatically" set a priority order for the control of a steam generating facility 120B and the control of a steam bypass facility 160 without any operator selection. Here, the automatic priority order determining unit 194 sets a priority order on the basis of a control command value V6 from a steam generating facility control unit 170B and a control command value V7 from a steam bypass facility control unit 200.

That is, the power generation/desalination complex plant 100U according to the present embodiment comprises the automatic priority order determining unit 194, and can therefore select a facility to send a bias control signal to while automatically calculating an operation efficiency at the time. Thus, in addition to the effects of the power generation/desalination complex plant 100T according to the third embodiment, operation with constantly high plant efficiency can be performed.

Fifth Embodiment

Figure 11:
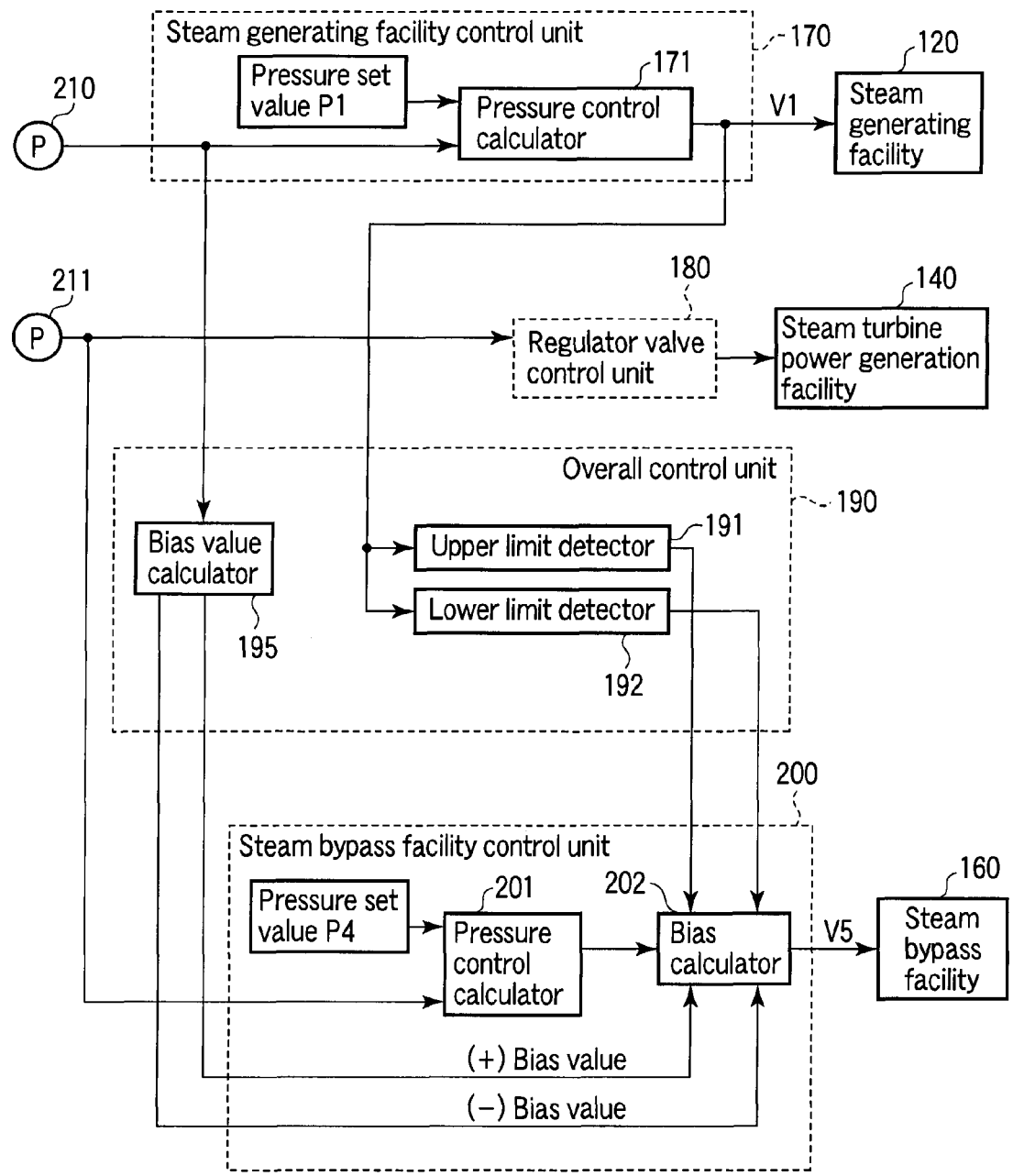
FIG. 11 is a diagram of the control system configuration of a power generation/desalination complex plant 100V according to a fifth embodiment of the present invention.
Figure 12:
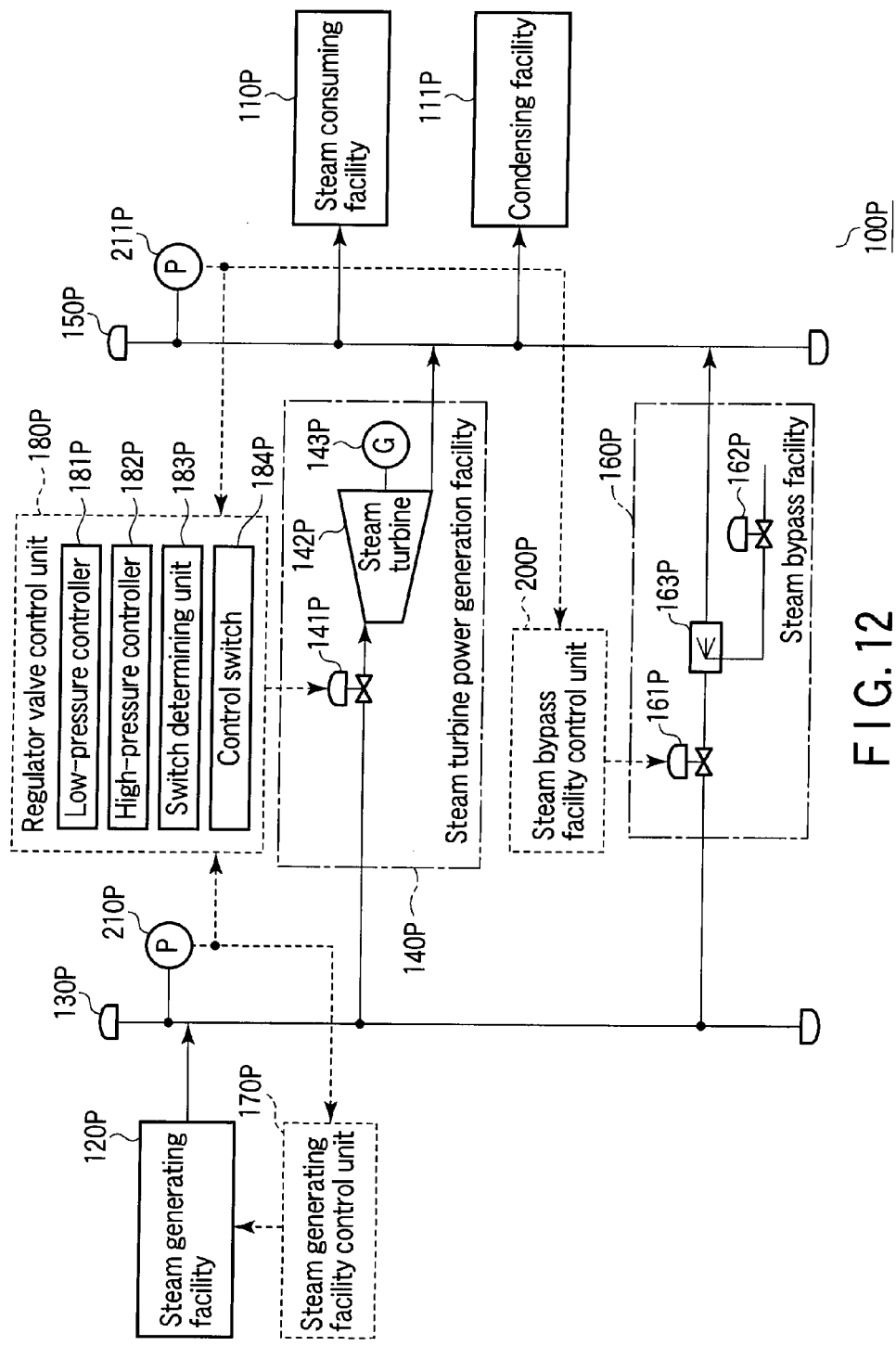
FIG. 12 is a schematic diagram showing the configuration of a general power generation complex plant.

FIG. 11 is a diagram of the control system configuration of a power generation/desalination complex plant 100V according to a fifth embodiment of the present invention.

In the power generation/desalination complex plant 100V according to the present embodiment, an overall control unit 190V has a bias value calculator 195. When a pressure signal is input to the bias value calculator 195 from a pressure detector 210 of a high-pressure steam header 130, the bias value calculator 195 calculates an optimum bias amount corresponding to the operation of the plant, and provides the bias amount to a bias calculator 202.

The bias amount can be calculated by the bias value calculator 195 on the basis of the change (inclination) of the steam pressure in the high-pressure steam header 130 with time. In this case, if the pressure of the high-pressure steam header 130 rapidly drops and is far below a pressure set value P1, the bias value calculator 195 calculates a greater bias amount and provides the bias amount to the bias calculator 202 of a steam bypass facility control unit 200. As a result, a bypass valve 161 activates earlier, and low-temperature sprayed water is provided earlier. Thus, the pressure of the high-pressure steam header 130 can be recovered early. When the pressure of the high-pressure steam header 130 slowly drops and is not too far below the pressure set value P1, the bias value calculator 195 calculates a smaller bias amount. As a result, the bypass valve 161 operates slowly, and adverse influence on the plant can be inhibited.

As described above, in the power generation/desalination complex plant 100V according to the present embodiment, the overall control unit 190V has the bias value calculator 195 for calculating a bias value from the steam pressure in the high-pressure steam header 130, so that a bias amount conforming to the state of the plant can be always calculated, and the plant can always operate stably.

Others

It should be noted that the present invention is not completely limited to the embodiments described above, and modifications of components can be made at the stage of carrying out the invention without departing from the spirit thereof. Further, various inventions can be formed by properly combining a plurality of components disclosed in the embodiments described above. For example, some of all the components shown in the embodiments may be eliminated. Moreover, the components can be suitably combined together in a different embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power generation complex plant comprising:
a steam generating facility;
a high-pressure steam header into which steam generated in the steam generating facility is supplied;
a steam power generating facility which generates electricity by use of the steam supplied from the high-pressure steam header;
a low-pressure steam header into which the steam flowing out of the steam power generating facility is supplied;
a steam bypass facility which links the high-pressure steam header to the low-pressure steam header in such a manner as to bypass the steam power generating facility and which adjusts the volume, pressure, and temperature of the steam supplied from the high-pressure steam header on the basis of a bypass steam volume control command value and then supplies the steam to the low-pressure steam header;
a steam consuming facility which uses the steam supplied from the low-pressure steam header;
a low-pressure control unit which controls the volume of steam to be supplied to the steam power generating facility on the basis of the steam pressure in the low-pressure steam header when the steam pressure in the high-pressure steam header is higher than a preset threshold value;
a high-pressure control unit which controls the volume of steam to be supplied to the steam power generating facility on the basis of the steam pressure in the high-pressure steam header when the steam pressure in the high-pressure steam header is lower than a preset threshold value;
a control switch unit which compares the steam pressure in the high-pressure steam header with the threshold value to switch between control by the low-pressure control unit and control by the high-pressure control unit;
a determining unit which determines that a desired steam volume of the steam consuming facility has reached an upper limit value of the volume of steam to be generated by the steam generating facility; and
a steam bypass facility control unit which adds programmed to add a bias value to the bypass steam volume control command value of the steam bypass facility to generate a new bypass steam volume control command value when the determining unit determines that the desired steam volume has reached the upper limit value, in order to control the volume and pressure of the steam passing through the steam bypass facility on the basis of the new bypass steam volume control command value.

2. The power generation complex plant according to claim 1, wherein
the determining unit determines the upper limit value in accordance with the steam pressure in the high-pressure steam header.

3. The power generation complex plant according to claim 1, wherein
the determining unit determines the upper limit value in accordance with a control command value for the steam generating facility.

4. The power generation complex plant according to claim 1, wherein
steam generated by another steam generating facility is also supplied into the high-pressure steam header,
the power generation complex plant further comprising a steam generating facility control unit which adds a bias value to a steam generation volume control command value for the other steam generating facility to generate a new control command value when the determining unit determines that the desired steam volume has reached an upper limit value of the generated steam volume, in order to control the volume of steam to be generated by the other steam generating facility on the basis of the new control command value.

5. The power generation complex plant according to claim 4, further comprising:
a priority order selecting unit which selects either control by the steam generating facility control unit or control by the steam bypass facility control unit on the basis of a preset priority order when the determining unit determines that the desired steam volume of the steam consuming facility has reached an upper limit value of the generated steam volume.

6. The power generation complex plant according to claim 5, wherein
the priority order selecting unit includes a unit which determines a priority order on the basis of power generation efficiency of the whole power generation complex plant.

7. The power generation complex plant according to claim 1, further comprising:
a bias value calculation unit which calculates the bias value from the steam pressure in the high-pressure steam header.

8. The power generation complex plant according to claim 1, wherein
the steam consuming facility is a desalination facility which consumes the steam supplied from the low-pressure steam header to generate product water.

9. The power generation complex plant according to claim 1, wherein
the steam generating facility is an exhaust heat recovery boiler which includes a duct burner and which uses an exhaust gas of a gas turbine as a heat source to generate steam.

10. A plant control method for use in a power generation complex plant, the power generation complex plant including:
a steam generating facility;
a high-pressure steam header into which steam generated in the steam generating facility is supplied;
a steam power generation facility which generates electricity by use of the steam supplied from the high-pressure steam header;
a low-pressure steam header into which the steam flowing out of the steam power generating facility is supplied;
a steam bypass facility which links the high-pressure steam header to the low-pressure steam header in such a manner as to bypass the steam power generating facility and which adjusts the volume, pressure, and temperature of the steam supplied from the high-pressure steam header on the basis of a bypass steam volume control command value and then supplies the steam to the low-pressure steam header;
a steam consuming facility which uses the steam supplied from the low-pressure steam header;
a low-pressure control unit which controls the volume of steam to be supplied to the steam power generating facility on the basis of the steam pressure in the low-pressure steam header when the steam pressure in the high-pressure steam header is higher than a preset threshold value;
a high-pressure control unit which controls the volume of steam to be supplied to the steam power generating facility on the basis of the steam pressure in the high-pressure steam header when the steam pressure in the high-pressure steam header is lower than a preset threshold value; and
a control switch unit which compares the steam pressure in the high-pressure steam header with the threshold value to switch between control by the low-pressure control unit and control by the high-pressure control unit,
the plant control method comprising:
a determining step of determining that a desired steam volume of the steam consuming facility has reached an upper limit value of the volume of steam to be generated by the steam generating facility; and
a steam bypass facility control step of adding a bias value to the bypass steam volume control command value of the steam bypass facility to generate a new bypass steam volume control command value when the determining step determines that the desired steam volume has reached the upper limit value, in order to control the volume and pressure of the steam passing through the steam bypass facility on the basis of the new bypass steam volume control command value.

11. The plant control method according to claim 10, further comprising:
a steam generating facility control step of adding a bias value to a control command value for another steam generating facility to generate a new control command value when the determining step determines that the desired steam volume has reached an upper limit value of the generated steam volume, in order to control the volume of steam to be generated by the other steam generating facility on the basis of the new control command value.

12. The plant control method according to claim 11, further comprising:
a priority order selecting step of selecting either control by the steam generating facility control step or control by the steam bypass facility control step on the basis of a preset priority order when the determining step determines that the desired steam volume has reached an upper limit value.

* * * * *